Fig. 2

Sept. 18, 1962 W. G. EDWARDS ETAL 3,054,988
MULTI-PURPOSE REGISTER
Filed May 22, 1957 12 Sheets-Sheet 3

INVENTORS:
Walter G. Edwards
Edmund F. Klein

By *Louis A Kline*
*John T. Matlago*
Their Attorneys

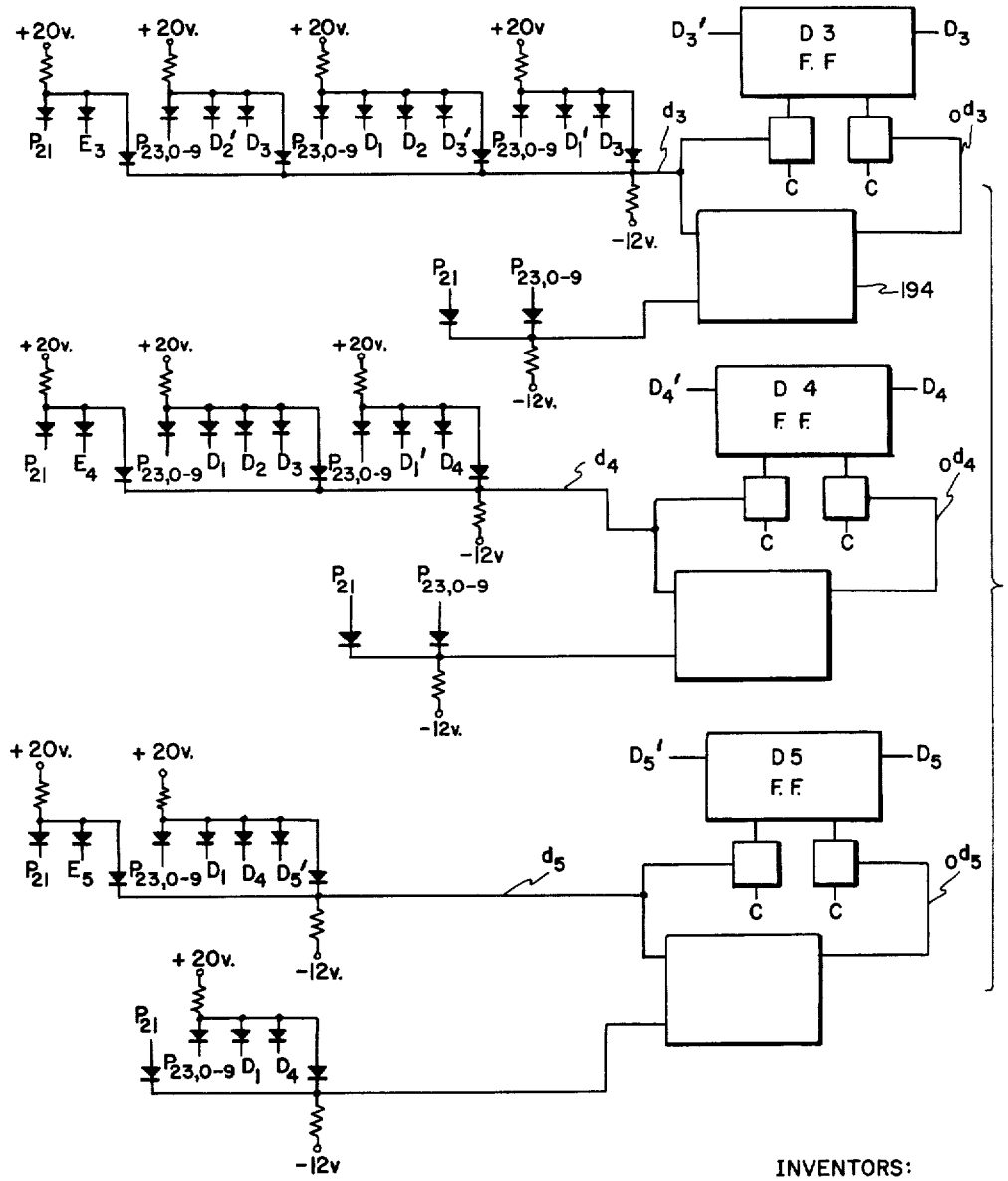

Table I

| | D5 | D4 | D3 | D2 | D1 | |
|---|---|---|---|---|---|---|
| $_0P_{s0}$ | 0 | 0 | 0 | 0 | 0 | $D_5'D_4'D_3'D_2'D_1'$ |
| $_0P_{s1}$ | 0 | 0 | 0 | 0 | 1 | $D_5'D_4'D_3'D_2'D_1$ |
| $_0P_{s2}$ | 0 | 0 | 0 | 1 | 0 | |
| $_0P_{s3}$ | 0 | 0 | 0 | 1 | 1 | |
| $_0P_{s4}$ | 0 | 0 | 1 | 0 | 0 | |
| $_0P_{s5}$ | 0 | 0 | 1 | 0 | 1 | |
| $_0P_{s6}$ | 0 | 0 | 1 | 1 | 0 | |
| $_0P_{s7}$ | 0 | 0 | 1 | 1 | 1 | |
| $_0P_{s8}$ | 0 | 1 | 0 | 0 | 0 | |
| $_0P_{s9}$ | 0 | 1 | 0 | 0 | 1 | |
| $_1P_{s0}$ | 1 | 0 | 0 | 0 | 0 | |
| $_1P_{s1}$ | 1 | 0 | 0 | 0 | 1 | |
| $_1P_{s2}$ | 1 | 0 | 0 | 1 | 0 | |
| $_1P_{s3}$ | 1 | 0 | 0 | 1 | 1 | |
| $_1P_{s4}$ | 1 | 0 | 1 | 0 | 0 | |
| $_1P_{s5}$ | 1 | 0 | 1 | 0 | 1 | |
| $_1P_{s6}$ | 1 | 0 | 1 | 1 | 0 | |
| $_1P_{s7}$ | 1 | 0 | 1 | 1 | 1 | |
| $_1P_{s8}$ | 1 | 1 | 0 | 0 | 0 | |
| $_1P_{s9}$ | 1 | 1 | 0 | 0 | 1 | $D_5 D_4 D_3'D_2'D_1$ |

INVENTORS:
Walter G. Edwards
Edmund F. Klein

By *Louis A. Kline*
*John J. Matlago*
Their Attorneys

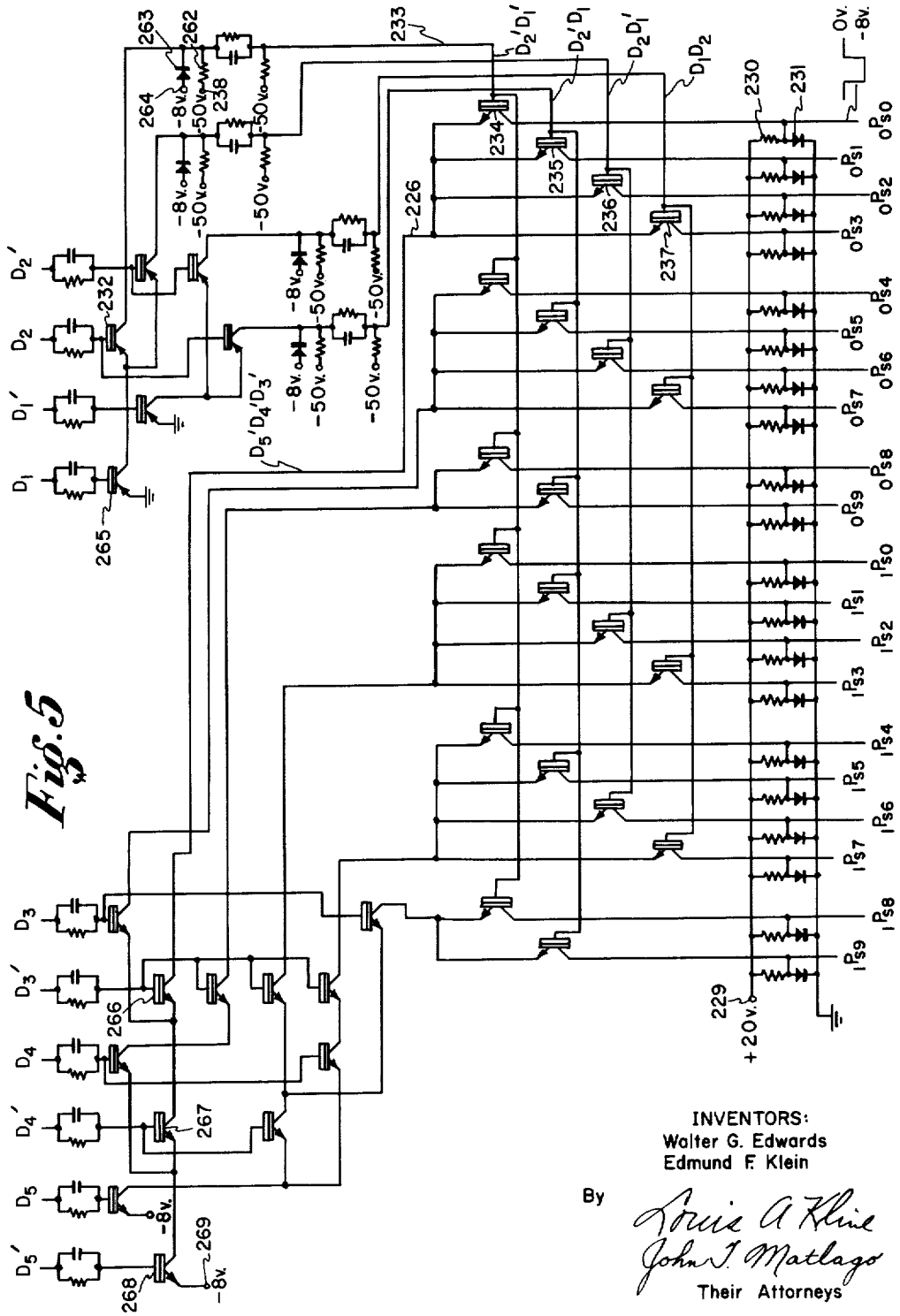

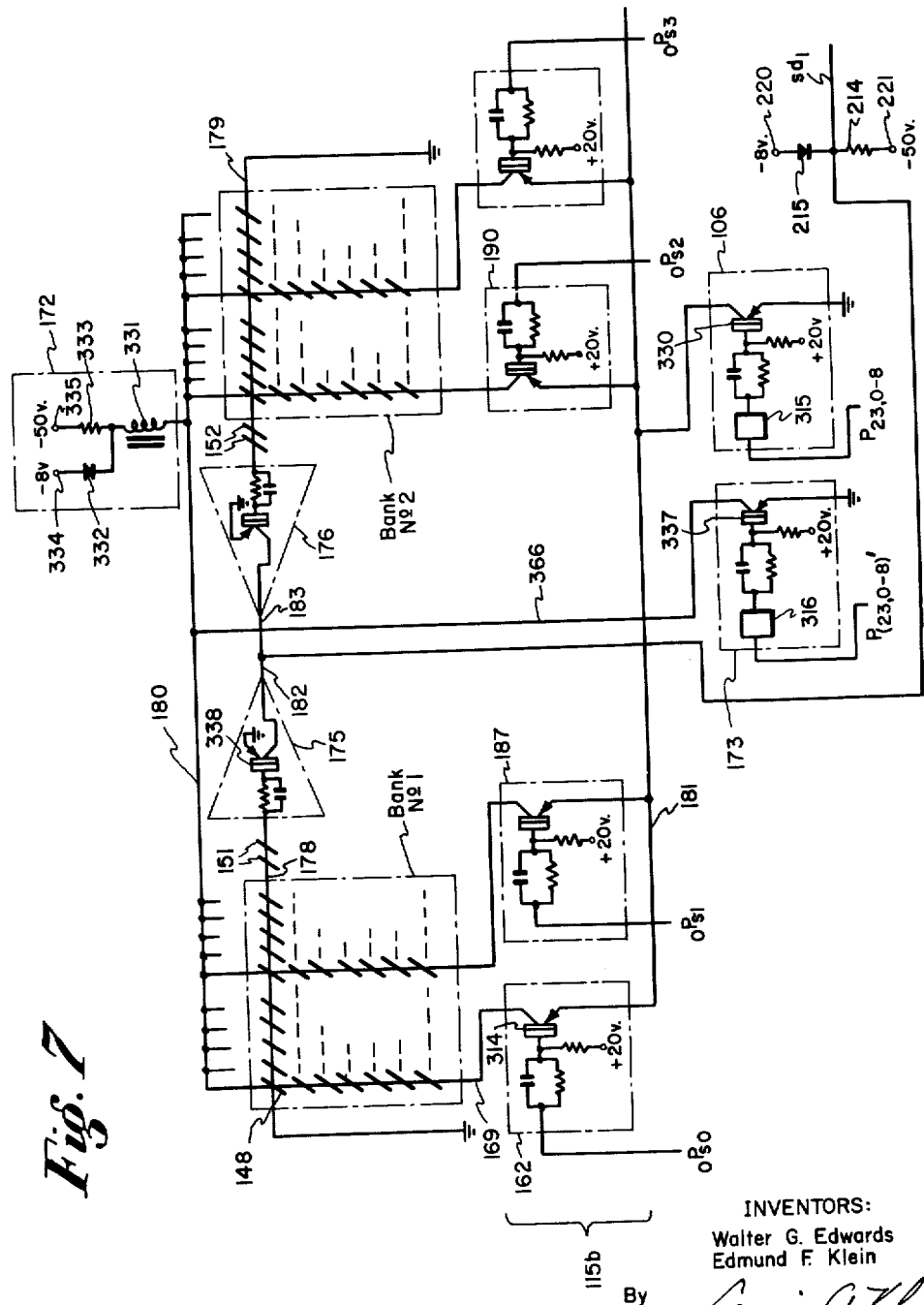

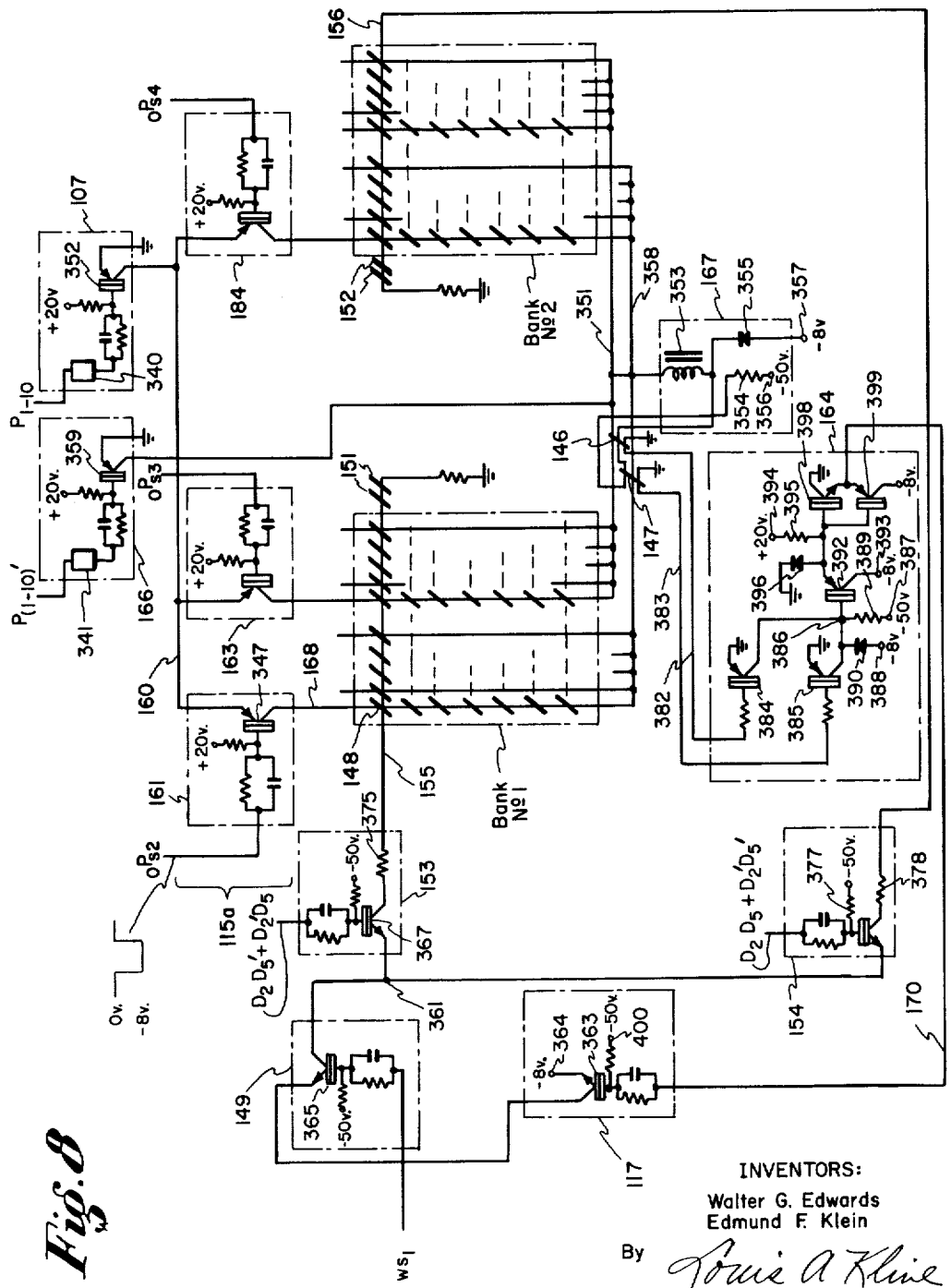

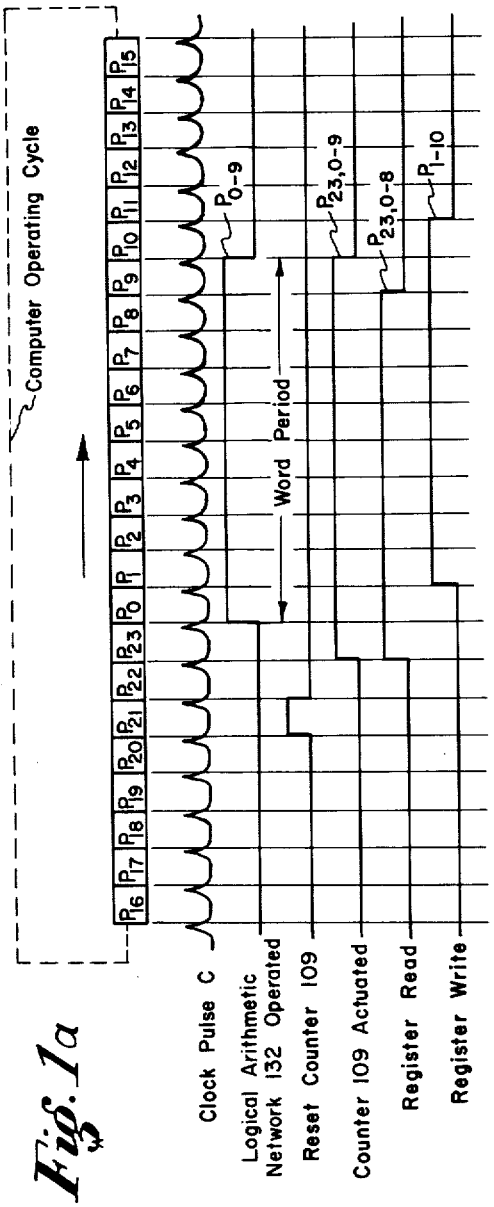
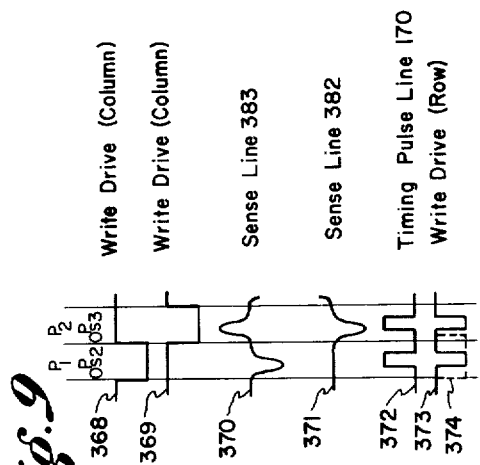
Fig. 1a
Fig. 9
INVENTORS:
Walter G. Edwards
Edmund F. Klein
Their Attorneys

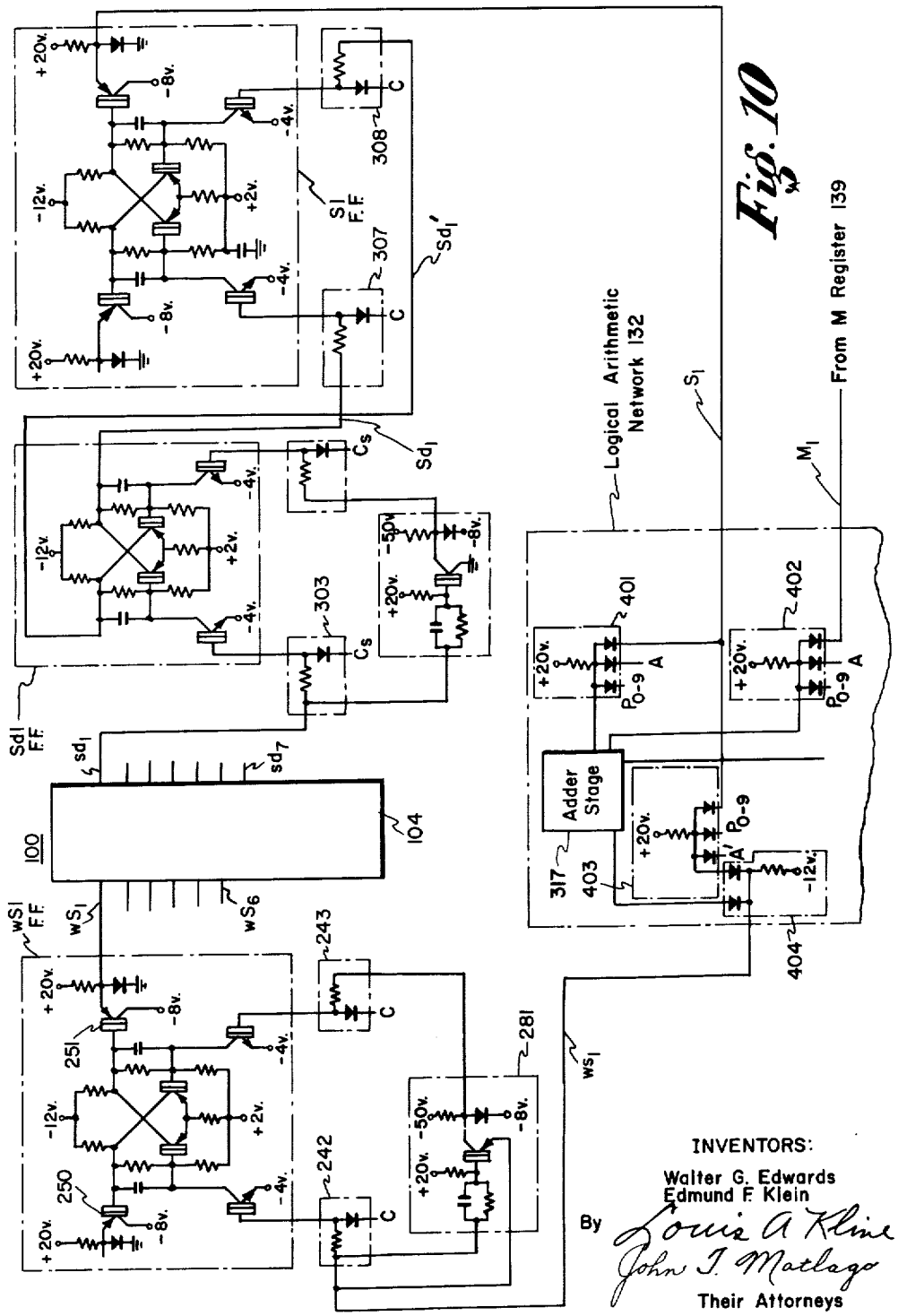

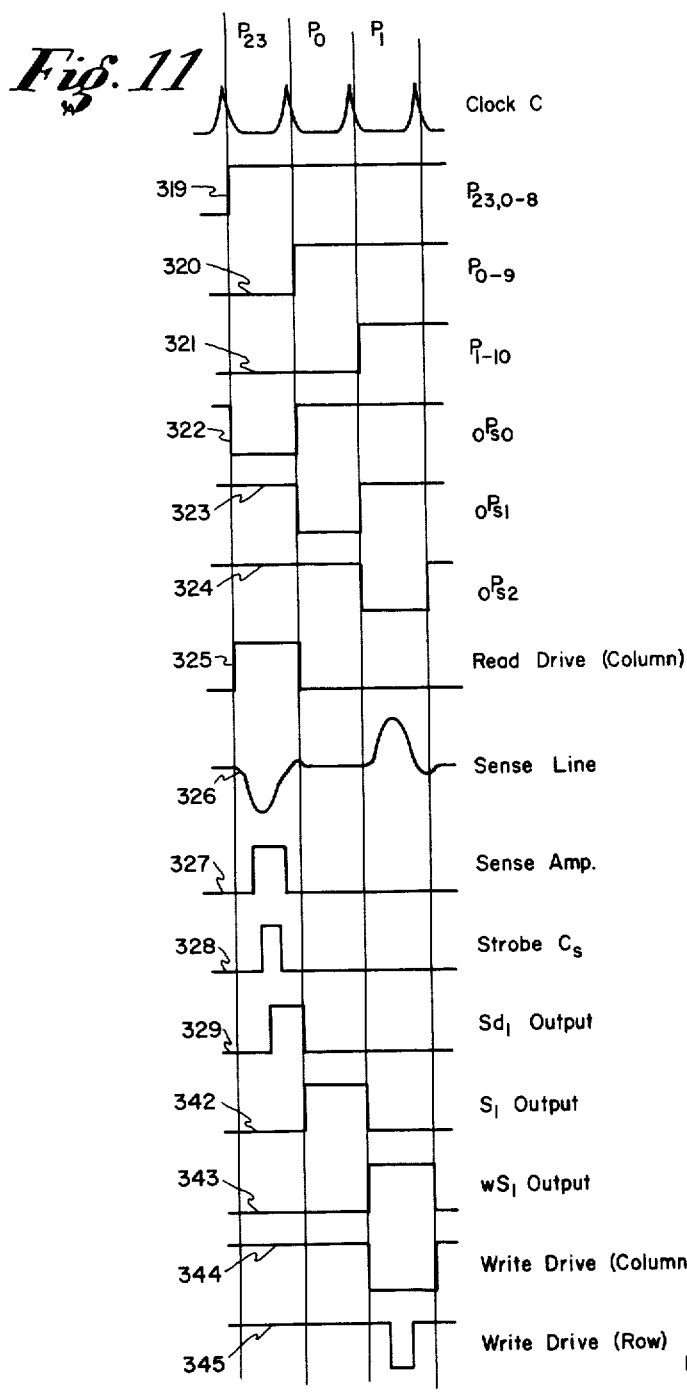

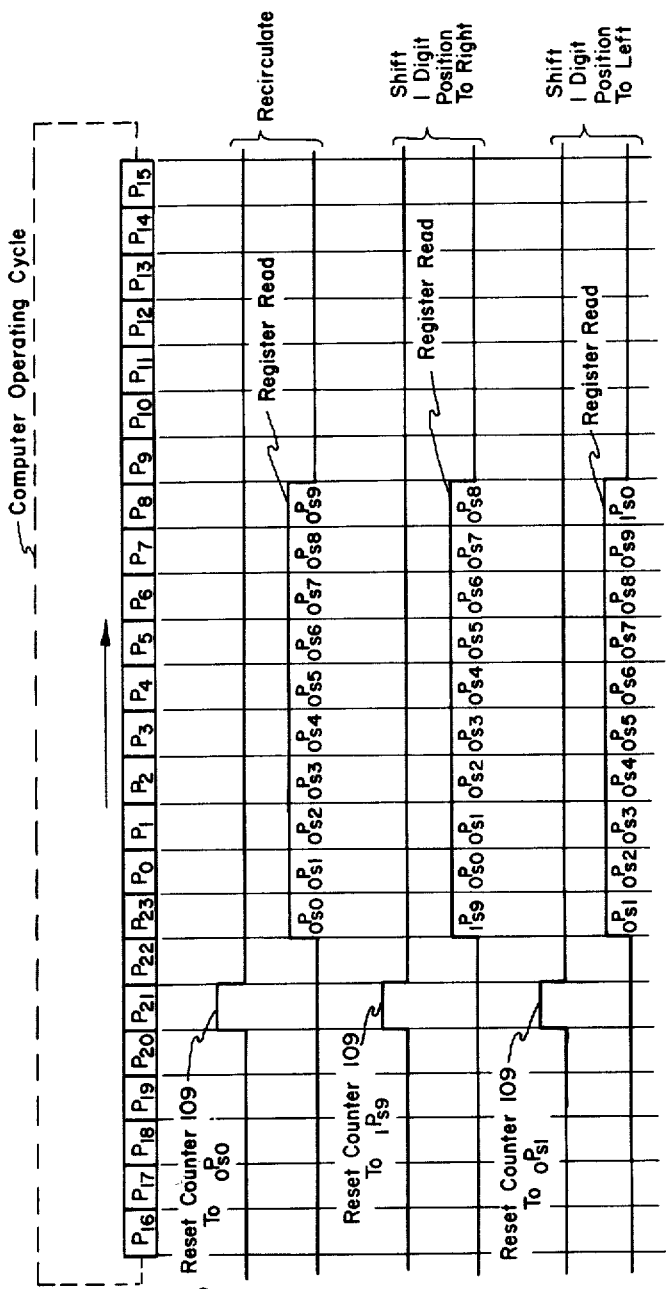

United States Patent Office 3,054,988
Patented Sept. 18, 1962

3,054,988
MULTI-PURPOSE REGISTER
Walter G. Edwards, Manhattan Beach, and Edmund F. Klein, San Pedro, Calif., assignors to The National Cash Register Company, Dayton, Ohio, a corporation of Maryland
Filed May 22, 1957, Ser. No. 660,796
12 Claims. (Cl. 340—172.5)

This invention relates to electronic digital data processors and more particularly to an improved multi-purpose register therefor.

Devices such as registers capable of retaining information, the information being usually a subset of the aggregate information in a digital computer, are utilized to cooperate with other computer components in the performance of myriad logical operations. Representative of these are the operations of static storage of data, serially recirculating data in order that it may be preserved as well as successively made available for logical manipulation with data from other sources, selective shifting of data relative to a given reference point in the computer word period, and temporarily storing of data during routing between components such as the main memory and another register, for instance.

It is thus an object of this invention to provide for a digital computer a versatile register capable of contributing to the performance of the aforementioned operations.

Another object of this invention is to provide a register arranged to afford simultaneous readout and write-in of data with respect to its storage unit.

Another object of this invention is to provide a static computer register capable of operating in a manner to shift a portion of a computer word stored therein from one position to another within a computer word period as defined by the computer basic operating cycle.

A feature of the register of the present invention is the combinational utility of transistor flip-flops and magnetic core elements where most appropriate, thereby taking advantage of the beneficial features of both types of bistable state devices. As a consequence, the register is characterized by great simplicity, ruggedness, speed of handling data, economy of space and reliability in view of the plurality of operations it is capable of executing.

Other objects, features and advantages of the invention will be present in the following description and claims, and illustrated in the accompanying drawings, which disclose the preferred mode for the form of the invention.

FIG. 1a is a timing diagram of the computer basic operating cycle whose periods control the operation of the register of FIG. 1.

FIG. 2 is a schematic diagram of the storage unit of the register.

FIGS. 3a and 3b show block diagrams of the column select counter flip-flops D1 to D5 together with their reset and counting trigger networks.

FIG. 5 is a circuit diagram of the output network of the column select counter.

FIG. 7 is a detailed circuit diagram of the reading circuitry for the storage unit.

FIG. 8 is a detailed circuit diagram of the writing circuitry for the storage unit.

FIG. 9 is a diagram of waveforms explaining the circuits for timing the row driving pulses.

FIG. 10 is a circuit diagram showing how the logical arithmetic network of FIG. 1 interconnects the output flip-flops of the storage unit to the input flip-flops thereof.

FIG. 11 is a diagram of waveforms for explaining the operation of the register.

FIG. 12 is a timing diagram of an example of the operation of the multiple purpose register for shifting digits within a computer word.

Figure 1:
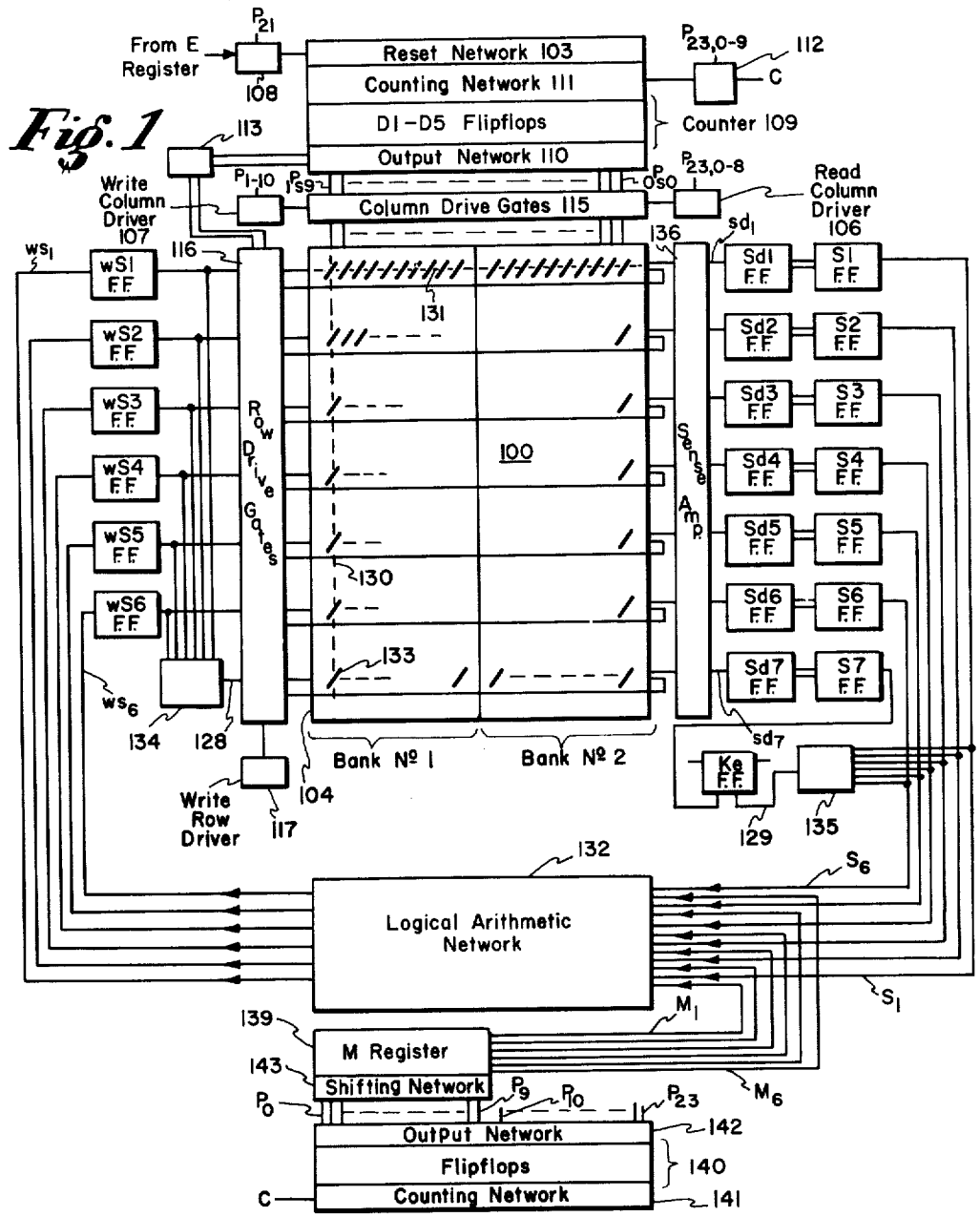
FIG. 1 is a block diagram of the multi-purpose register, showing also an example of its connection to other computer components.

Referring to FIG. 1, the multi-purpose register 100 of the present invention is shown connected in combination with a logical arithmetic network 132 by which information in flip flops $Sd1$–$Sd6$, as read from storage unit 104 of the register, upon being stepped into flip-flops $S1$–$S6$, can be circulated or logically combined with data received from other computer components, such as M register 139 shown, and directed to be written back by way of flip-flops $wS1$–$wS6$ into the storage unit 104.

The storage unit 104 comprises a core matrix divided into bank No. 1 and bank No. 2, each bank having ten columns of cores, such as column 130. Each column of cores has seven cores arranged with cores of the other columns as shown, so as to form rows, such as row 131. Individual cores of each column store a binary digit of a binary coded decimal digit of information stored in the column. Thus it can be seen that the twenty columns of storage unit 104 have storage capacity for 20 binary coded decimal digits. Inasmuch as a computer word is defined as comprising 10 binary coded decimal digits, the storage unit 104 has the capacity to store two computer words. Since a binary coded decimal digit is defined by six binary digits, the cores in the lowest row of the storage unit 104, shown in FIG. 1, such as core 133, are utilized to store a check digit as will be subsequently discussed.

The storage unit 104 is provided with a column select counter 109, which is connected to column drive gates 115 by 20 counter lines, defined in two groups of ten lines each (see FIG. 4), such as $_0P_{s0}$ to $_0P_{s9}$, inclusive, and $_1P_{s0}$ to $_1P_{s9}$, inclusive, counting in that order. The counter 109 functions to select columns of cores in the storage unit 104 to be driven by pulses by pulses from read and write column drivers 106 and 107, respectively. Counter 109 includes flip-flops D1 to D5, reset network 103, counting network 111, and output network 110. The counting network 111 is arranged such that if, during the period the counter 109 is actuated, it reaches its final count $_1P_{s9}$, the counter starts counting over again in order. In addition to selecting columns of cores, output network 110 also provides lines for controlling bank selector network 113 which determines whether information is to be written into a column of bank No. 1 or bank No. 2 by properly opening row drive gates 116 for supplying pulses from write row driver 117 to the cores in one bank or the other.

Before further describing the multi-purpose register 100 of the present invention, reference should be made to FIG. 1a which shows the computer basic operating cycle whose counting periods control the operation of the storage unit 104. This computer basic operating cycle is shown to be 24 clock periods long, as defined by the outputs $P_0$ to $P_{23}$ inclusive, obtained from the output network 142 of a basic operating cycle counter 140, as shown in FIG. 1. Counting network 141 of basic operating cycle counter 140 is continually actuated by the computer clock signal C. However, as indicated in FIG. 1a, the column select counter 109 is limited to being actuated by clock pulses C only during pulse periods $P_{23,0-9}$ of the basic cycle counter 140. As also indicated in FIGS. 1 and 1a, counter 109 is set at period $P_{21}$ of the computer operating cycle to any of its 20 counts by the opening of gate 108 which passes the reset information from an external E register (not shown) to the reset network 103. The counter 109 then is actuated by clock pulses C received during timing period $P_{23, 0-9}$ to count forward eleven times from this initial setting. As noted in FIG. 1a, the columns of the storage unit 104 of the multi-purpose register 100 are read out of during period $P_{23, 0-8}$ and are written during period $P_{1-10}$. It is also noted that period $P_0$ to $P_9$ inclusive, is denoted as the word period and it is during this time that the signals read from the storage unit are sensed in logical arithmetic network 132.

Since the column select counter 109 of the invention can be set to any count setting from which it advances during the reading and writing periods of the computer basic operating cycle, and each count identifies a different column in bank No. 1 and bank No. 2 of the storage unit 104, the binary coded decimal digits stored in the columns can be shifted in relation to the periods of the main computer operating cycle counter 140 by changing the counter 109 setting. Thus the flexibility of the counter 109 provides a means for shifting the position of binary coded decimal digits as read from the storage unit 104 with respect to the fixed computer word period.

Returning to FIG. 1, column drive gates 115, as controlled by the contents of the column select counter 109, are capable of simultaneously connecting the read column driver 106 and the write column driver 107 to a column of cores in opposite banks in a certain predetermined order so as to cause cores of one column to be driven for writing a binary coded decimal digit therein, and the cores of the other column to be driven for reading a binary coded decimal digit therefrom. The pulses from write column driver 107 are applied simultaneously with the pulses from the write row driver 117 which are gated onto the rows of cores in accordance with data stored in input flip-flops $wS1$ to $wS6$, inclusive, and the results of an input check logic network 134. The pulses from the read column driver 106 operate by themselves to simultaneously read out data in all the cores of the selected column by way of sense amplifiers 136 which trigger output flip-flops $Sd1$ to $Sd7$, accordingly. It should thus be clear that write-in and read-out of a column of data, representing a binary coded decimal digit in the storage unit 104, is provided by the input set of flip-flops $wS1$–$wS6$ and the output set of flip-flops $Sd1$–$Sd6$, respectively, the binary coded decimal digit column of cores being written into or read out of the sets of transistor flip-flop circuits in parallel. It is thus seen that the multi-purpose register 100 of the present invention operate in a parallel manner on the binary digits representing each coded decimal digit, and in a serial manner on the binary coded decimal digits.

Data read from a column of the storage unit 104 into the output set of flip-flops $Sd1$ to $Sd6$ during a clock period is shifted in parallel into the $S1$ to $S6$ flip-flops at the end of the clock period. This data can then be circulated in parallel, by way of logical arithmetic network 132 which responds to the outputs of flip-flops $S1$ to $S6$, back into the input set of flip-flops $wS1$ to $wS6$ of the storage unit 104 at the end of the following clock period. The circuits are arranged such that this data can be written into the same column of the storage unit 104 from which it was previously read. Thus the recirculation path is from a selected column of the storage unit 104, through the sense amplifier 136, the $Sd1$ to $Sd6$ flip-flops, the $S1$ to $S6$ flip-flops, the network 132, the $wS1$ to $wS6$ flip-flops, and back into the same column of the storage unit 104.

It should be noted that an input check logic network 134 is connected to flip-flop outputs $wS1$ to $wS6$ to form the check bit signal to pass into storage unit 104 on line 128 when writing into a column. Upon reading a column an output check logic network 135 responds to the output on lines $S_1$ to $S_6$ from flip-flops S1 to S6, respectively, to pass a check bit signal on line 129 to error flip-flop $Ke$. The other input to error flip-flop $Ke$ is the check bit on line $S_7$ read from the core, as 133, and transferred to flip-flop S7. If these digits are different, it indicates that the circuits of the storage unit 104 have not operated properly and the true output of the $Ke$ flip-flop can be employed to halt the computer operation.

In addition to utilizing the multi-purpose register 100 shown in FIG. 1 to circulate data, it is possible to logically modify the information read from a column of the storage unit of the multi-purpose register 100 by combining it with other information simultaneously received from an M register 139, for example. The outputs of the M register are received on lines $M_1$ to $M_6$ in parallel with lines $S_1$ to $S_6$. The computer basic operating cycle counter 140 actuates the shifting network 143 of M register 139 during the time that its count outputs $P_0$ to $P_9$ are effective, thus serially shifting a binary coded decimal digit of data onto lines $M_1$ to $M_6$.

In operation, in the preferred embodiment, during a first computer clock signal C period, a binary coded digit, together with the check digit, as stored in a column of the storage unit 104 specified by the counter 109, is read out and set up in the $Sd1$ to $Sd7$ flip-flops. At the end of this first computer clock period this same coded decimal digit, as well as the check digit, is set up in the S1 to S7 flip-flops whose outputs are immediately sensed by the logical arithmetic network 132 such that at the end of the second computer clock period the same binary coded digit can be set up in the $wS1$ to $wS6$ flip-flops for writing back into the same column of the storage unit during a third computer clock period. Since the present invention circuitry for reading data out of the storage unit 104, logically manipulating, and then writing data back into the storage unit, it should be understood that during each clock period, all three of these operations, that is, read, logical manipulation, and write, are being performed simultaneously on data representing a different column of information.

Figure 2:
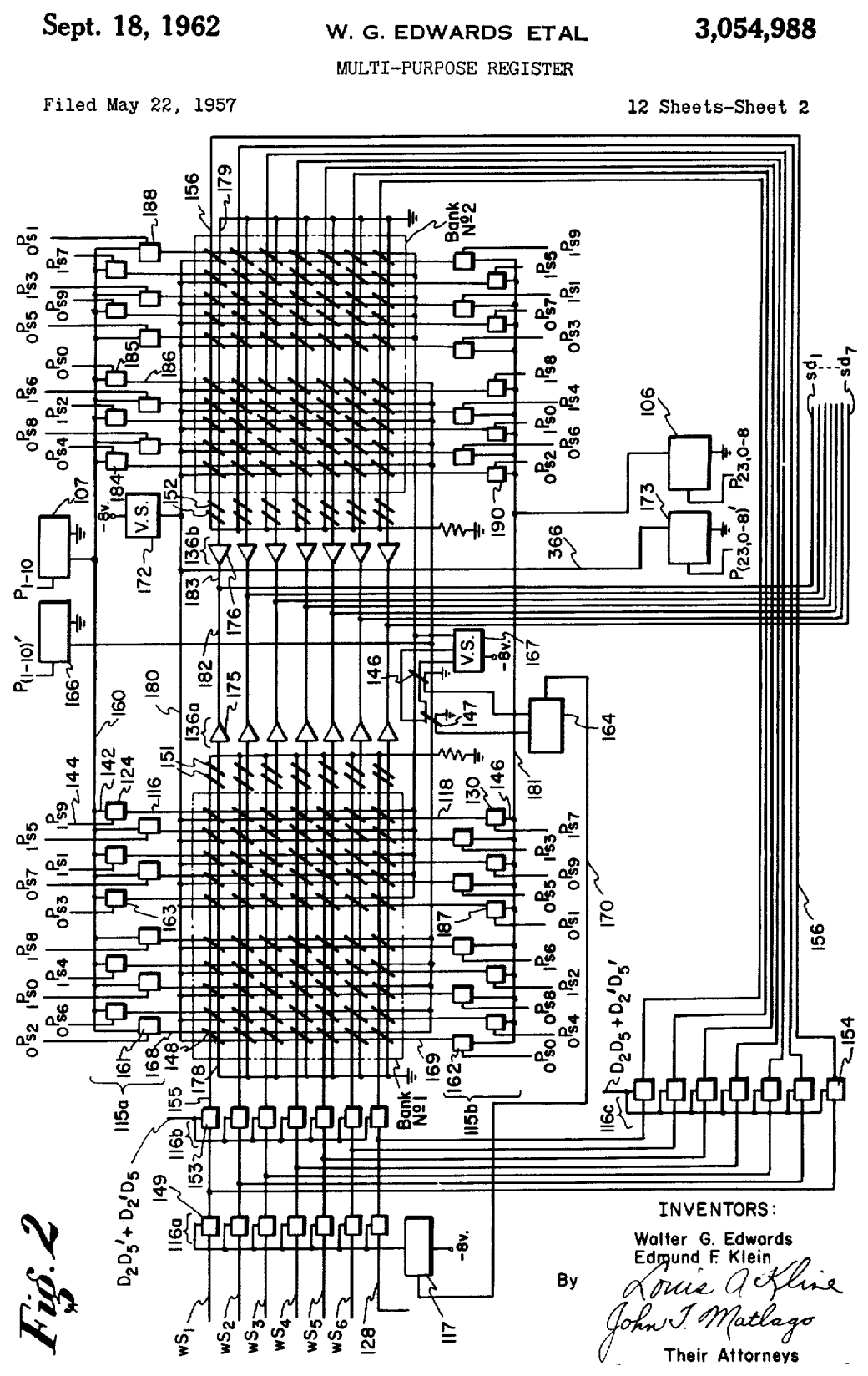

Referring now to FIG. 2, showing a schematic diagram of storage unit 104 of FIG. 1, a further description will be made of the circuit arrangement of the register of the present invention. As previously described, bank No. 1 and bank No. 2 each comprise ten columns of cores for storing data. Inputs to the storage unit 104 on lines $wS_1$ to $wS_6$ and 128 control the set of drive gates 116a which pass drive pulses from write row driver 117 in accordance with these inputs. From the drive gates 116a, the input signals are individually gated to either bank No. 1 or bank No. 2 by the sets of bank gates 116b or 116c, respectively, one of which is controlled to be opened by the output of bank selector 113 of FIG. 1. From gates 116b to 116c, drive lines, such as the first row drive lines 155 and 156, respectively, pass through a row of cores to ground in banks No. 1 and No. 2, respectively. Thus the signals on the input lines $wS_1$ to $wS_6$ enable drive pulses to be gated to rows of cores in either bank No. 1 or bank No. 2.

Selection of columns of cores in storage unit 104 for writing is by the set of write column drive gates 115a, shown positioned in FIG. 2 above the two banks of cores. As shown, each of these gates is controlled by a counter signal, supplied by counter 109 (FIG. 1). Thus a selected write column drive gate, such as gate 161, gates, in response to counter signal $_0P_{s2}$, a write driving pulse from write column driver 107 during period $P_{1-10}$. This write driving pulse is applied on line 160 and passed through selected column drive line 168 to voltage supply 167. Write auxiliary driver 166, as will be explained later, also supplies a current directly to voltage supply 167 when write column driver 107 is not conducting, i.e., during period $P_{(1-10')}$. Thus it can be seen that for writing into a column of cores, one of the cores, such as 148, is selected to be driven to its opposite magnetic state by a coincidence of a current pulse on lines 155 and 168. Timing gate 164 is operated by a signal sensed by turning over timing core 146 or 147 as each write driving pulse is passed through a drive line, as 168, from write driver 107 to voltage supply 167. Thus the timing of row driver 117 is a function of the write column drive, as will be explained subsequently. It should be noted that two noise cancelling cores in each row in banks No. 1 and No. 2, as 151 and 152, respectively, act to cancel the output noise signals caused by release of a row drive current pulse. The cancelling action of these cores will be explained subsequently.

Selection of a column of cores to be read is by the set of read column drive gates 115b, shown positioned in FIG. 2 below the two banks of cores. As shown, each of these gates is controlled by a counter signal from counter 109 (FIG. 1). Thus, when a column drive gate, such as gate 162, is selected in response to a counter signal $_0P_{s0}$, a current pulse is passed from read column driver 106, through common line 181, through read drive line 169, and through common line 180 to voltage source 172. Read auxiliary driver 173, which will be explained later, also passes current directly to voltage source 172 when read driver 106 is not conducting, read driver 106 and read auxiliary driver 173 being controlled by timing signals $P_{23,0-8}$ and $P_{(23,0-8)}'$, respectively, which are the complements of each other. Thus reading of storage unit 104 is accomplished by selecting a column of cores and gating a single current pulse through that column of sufficient amplitude to drive the cores therein to the opposite magnetic state.

Reading from a column of cores through which a driving pulse is passed by selection of a column gate, as 162, is accomplished by the set of sense amplifiers 136a for bank No. 1 and the set of sense amplifiers 136b for bank No. 2. Thus each row of cores in bank No. 1 has a sense amplifier, such as 175, connected to sense line 178 which passes through the first row of cores to ground in bank No. 1. Likewise, each row of cores of bank No. 2 has a sense amplifier, such as 176, connected to sense line 179 which passes through the first row of cores to ground in bank No. 2. The outputs 182 and 183 of the sense amplifier, as 175 and 176, respectively, are connected to line $sd_1$ which is the input to flip-flop $Sd1$ of FIG. 1, for example.

The selection of columns for reading from one bank, as bank No. 1, while simultaneously writing into the other bank, as bank No. 2, will now be explained. Reading and writing cannot occur simultaneously in the same bank since the information written into a core by a row and a column drive would cause an undesired signal to appear on the sense line in that row. The connection of the counter signals, as $_0P_{s2}$, controls the write and read column drive gates of different banks, such as 161 and 190, respectively. This arrangement provides for writing into bank No. 1 while reading out of bank No. 2. As previously discussed, there is a two period time delay between reading from a particular column of cores, recirculating the signals, and writing back into the same column of cores.

Thus it should be noted that read column gate 162 is opened at counter time $_0P_{s0}$ to select the column containing drive line 169 for reading from bank No. 1. At this same counter time, $_0P_{s0}$, write column gate 185 in bank No. 2 is opened for writing into the column of cores containing drive line 186. At counter time $_0P_{s1}$, read column gate 187 is opened for reading out of bank No. 1 and write column gate 188 is simultaneously opened for writing into bank No. 2. At counter time $_0P_{s2}$, read column gate 190 is opened for reading out of bank No. 2 and write column gate 161 is simultaneously opened for writing into bank No. 1. It is to be noted that the same column of cores being read by a pulse passing through read column gate 162 in response to counter signal $_0P_{s0}$ is controlled to be written into by a pulse passing through write column gate 161 selected in response to counter signal $_0P_{s2}$, which occurs two clock periods later. It should be further noted that because of the two period delay in writing into a column, after it is read, the information is read in sequence from two columns of one bank, as bank No. 1, while information is written in sequence into two columns of the other bank, as bank No. 2, in order to always read and to write from opposite banks.

It is to be noted that this arrangement of sequentially reading two columns in one bank and simultaneously sequentially writing into two columns in the other bank, and then for the succeeding two count times switching to reading and writing columns in opposite banks, is a continuous process which is repeated every two counts for all 20 counts from $_0P_{s0}$ to $_1P_{s9}$ of the column select counter 109 (FIG. 1).

To enable data to be written into the columns of cores by passing driving current pulses through alternate rows of bank No. 1 or No. 2 as above described, a first set of gates 116b is provided for passing pulses to bank No. 1 in response to a signal $D_2D'_5+D'_2D_5$ derived from bank selector 113 (FIG. 1), and a second set of gates 116c is provided for passing driving pulses to bank No. 2 in response to a signal $D_2D_5+D'_2D'_5$ from bank selector 113. As will be explained, these expressions, representing combinations of signals from the D2 and D5 flip-flops, are true or high in potential for every other pair of counts of the column select counter 109 (FIG. 1).

The detailed circuitry of the column select counter 109 will now be described by reference to FIGS. 3a to 6.

Figure 3A:
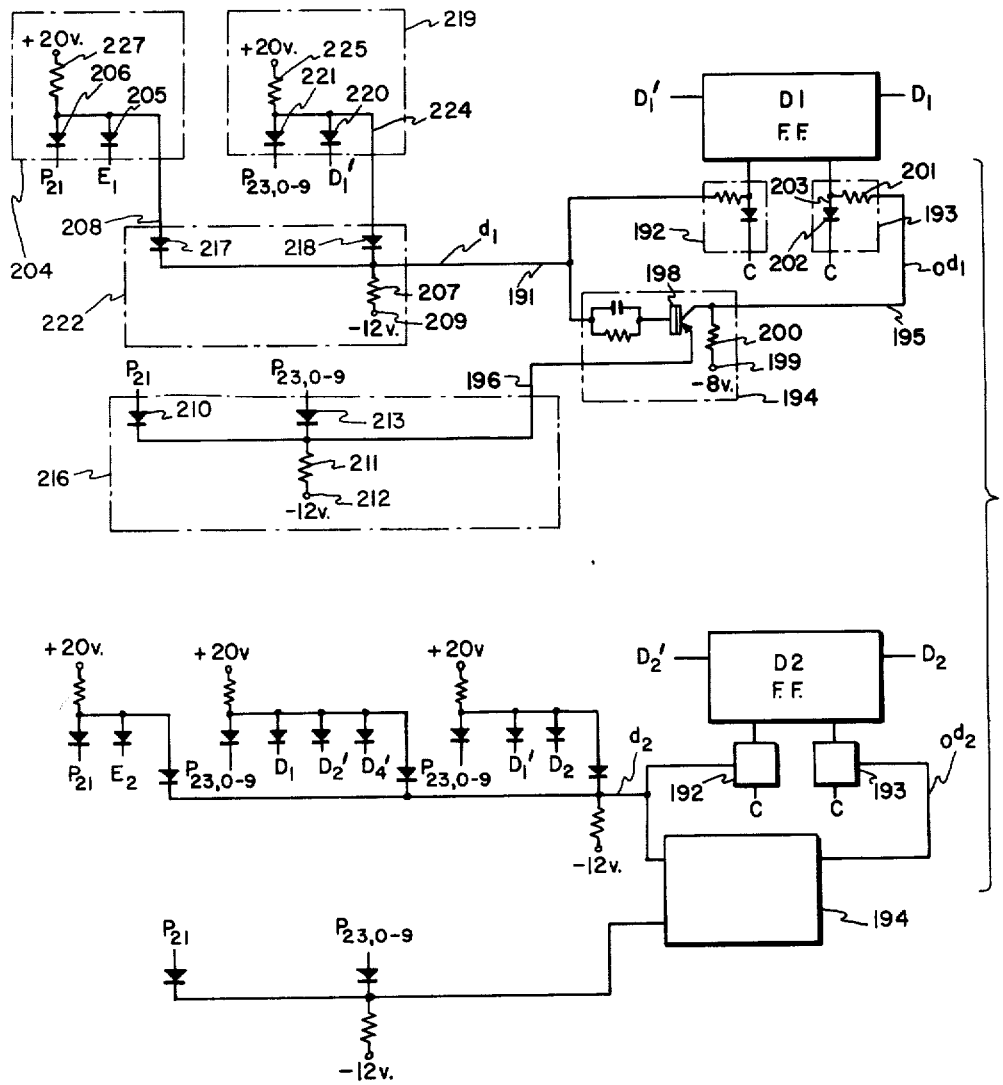
Figures 4, 6:
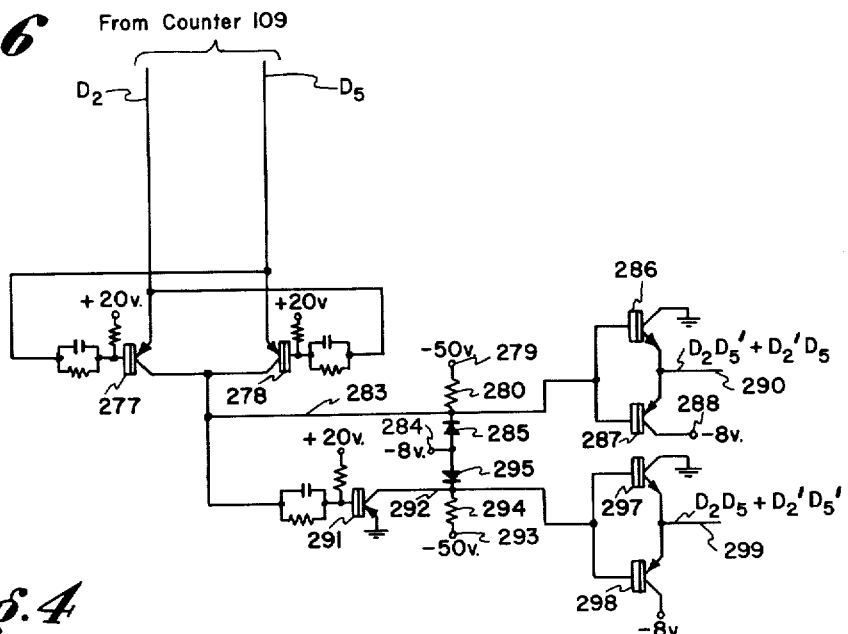
FIG. 4 is a table showing the combination of states of the flip-flops D1 to D5 which define the various counter outputs.
FIG. 6 is a circuit diagram of the bank selecting network for the storage unit.

The counting network 111 and the reset network 103, for flip-flops D1 to D5 which comprise counter 109 (FIG. 1), are shown in detail in FIGS. 3a and 3b. In addition, the output network 110, for indicating the count content of counter 109, is shown in detail in FIG. 5, and the selecting network 113 for indicating alternate pairs of counts of the counter for selecting banks No. 1 and No. 2 of the storage unit, is shown in FIG. 6. Each of the flip-flop circuits D1 to D5 is the same and the detail circuit arrangements thereof are well understood in the art. As shown in FIG. 3a, flip-flop D1 is provided with input signals $d_1$ and $_0d_1$ on lines 191 and 195 for triggering the flip-flop into the true or false state, respectively. Thus, whenever input $d_1$ or $_0d_1$ is high in potential, a clock signal C is gated by way of gate 192 or 193 to the true or false trigger inputs, respectively, of the flip-flop. As shown, gate 193 comprises a junction 203 having input line 195 connected thereto by resistor 201, and a clock signal line connected thereto by a diode 202. Junction 203 is impressed with a positive clock signal C received on the clock line only when there is a high potential signal $_0d_1$ on line 195. Inverter gate 194 provides a means for setting flip-flop D1 to the false state as a function of the true input signal $d_1$ on line 191. Inverter gate 194 comprises p-n-p transistor 198, the emitter of which is connected to a timing line 196 and the base of which is connected to line 191 impressed with the signal $d_1$. The collector of transistor 198 is connected to −8 volt terminal 199 by way of resistor 200. Transistor 198 conducts only when the signal $d_1$ on line 191 is low in potential and the timing signal on line 196 is high in potential, causing current to pass from line 196 through resistor 200 to −8 volt terminal 199, resulting in the signal $_0d_1$ on line 195 being high in potential. Thus, under these conditions, flip-flop D1 is triggered into a false state. It should now be clear that when line 196 is at a high potential, a high potential on line 191 causes flip-flop D1 to be triggered to a true state and a low signal on line 191 causes flip-flop D1 to be triggered to a false state. When either a low potential signal appears on line 196 or a high potential signal is present on line 191, flip-flop D1 cannot be triggered to the false condition. Thus flip-flop D1 can be triggered to indicate the binary digit represented by a single signal waveform $d_1$ on line 191 only by maintaining line 196 at a high potential. However, since it is desired to maintain the true state of flip-flop D1 during certain periods of the basic computer operating cycle when a low input signal appears on line 191, computer timing logic is provided to maintain a high potential on line 196 only when it is desired to set the flip-flop D1 false as a function of the true input $d_1$. It is to be noted that the trigger input gating arrangement of flip-flops D2 to D5, inclusive, is the same as that described for flip-flop D1.

The circuitry for resetting counter 109 will now be explained by reference to the trigger diode networks shown in FIGS. 3a and 3b. Flip-flops D1 to D5 are set from the E register (not shown) in accordance with signals on lines $E_1$ to $E_5$, which serve to gate clock signals on the true trigger inputs of flip-flops D1 to D5, respectively, at the end of computer period $P_{21}$. Thus input line $E_1$ is connected to the cathode of a diode 205 and input line $P_{21}$ is connected to the cathode of a diode 206, the anodes of which are connected by way of resistor 227 to $+20$ v. source, thereby forming an "and" gate 204 having an output line 208. This line 208 is connected to the anode of a diode 217 whose cathode is connected to $-12$ volt terminal 209 by way of a resistor 207. This diode 217, together with a diode 218 which is similarly arranged to respond to the output 224 of "and" gate 219, to be described subsequently, forms "or" gate 222. When signals $P_{21}$ and $E_1$ are both high in potential (0 volts), current passes through resistor 207 to $-12$ volt terminal 209 causing signal $d_1$ on output line 191 from "or" gate 222 to be high in potential. If signal $E_1$ is low in potential ($-8$ volts) when signal $P_{21}$ is high in potential, output line 191 is at the low potential.

The timing signal on line 196 is controlled by the output of an "or" gate 216 which includes a first diode 210 to the anode of which computer timing signal $P_{21}$ is connected and a second diode 213 to the anode of which computer timing signal $P_{23,0-9}$ is connected. The cathodes of these diodes are connected to $-12$ volt terminal 212 by way of resistor 211. Thus, when $P_{21}$ is at the high operating potential, current passes through resistor 211 to $-12$ volt terminal 212 resulting in the signal $_0d_1$ on line 195 being at the high potential of 0 volts if line 191 is at the low potential. Otherwise, signal $_0d_1$ is at the low operating potential if line 191 is at the high potential. In other words, when $P_{21}$ is high in potential, the binary information on line $E_1$, whether it be a "one" or a "zero," is set up in flip-flop D1 in response to the clock pulse C gated through either gate 192 or 193. The trigger input network for resetting the remaining flip-flops D2 to D5 of the counter, in accordance with signals $E_2$ to $E_5$, respectively, of the E register, is similarly arranged and will not be further described.

The counting network 111 shown in FIG. 1 will now be explained by reference to FIG. 4, which is a table showing how flip-flops D1 to D5 change states to indicate successive counts of counter 109. The counter 109 always counts forward eleven times from the initial counter setting during computer basic operating time periods $P_{23,0-9}$, which signal is connected in combination with the counter logic as inputs to the "and" gates forming the true input trigger networks of the flip-flops. The counter logic is arranged to advance at each clock pulse C in response to the conditions of the flip-flops, as shown in the table in FIG. 4.

Thus flip-flop D1 stores the lowest order digit of the counter and, according to Table I of FIG. 4, changes state on successive counts. As shown in FIG. 3a, input signal $D_1'$ is combined with signal $P_{23,0-9}$ in "and" gate 219 whose output 224 is connected to $d_1$ by way of "or" gate 222. Flip-flop D1 will therefore be set true during $P_{23,0-9}$ only when $D_1'$ is high, causing current to pass from the 20 volt source through resistor 207 to $-12$ volt terminal 209, causing a high signal to appear on line 191. Flip-flop D2 is set true whenever flip-flop D1 is false and flip-flop D2 is true, or when flip-flop D1 is true and flip-flops D2 and D4 are false. As shown in FIG. 3a, these two conditions are satisfied by two "and" gates whose outputs are combined in an "or" gate to form the true trigger signal $d_2$ for flip-flop D2, in a manner similar to that described for flip-flop D1. For all other conditions of the counter flip-flops, flip-flop D2 is set false since the presence of timing signal $P_{23,0-9}$ at the input of inverter gate 194, as previously described, causes input signal $_0d_2$ to be high, if $d_2$ is low in potential. Flip-flop D3 is set true when flip-flop D2 is false and flip-flop D3 is true, or when flip-flop D1 is false and flip-flop D3 is true, or when flip-flops D1 and D2 are true and flip-flop D3 is false. As shown in FIG. 3b, these conditions are satisfied by the three "and" gates whose outputs are combined in an "or" gate to form the input signal $d_3$ in a manner similar to that described for flip-flop D1. For all other conditions of the counter flip-flops, flip-flop D3 is set false since the presence of timing signal $P_{23,0-9}$ at the input of inverter gate 194 causes input signal $_0d_3$ to be high if $d_3$ is low in potential. Flip-flop D4 is set true when flip-flops D1, D2, and D3 are all true or when flip-flop D1 is false and flip-flop D4 is true. As shown in FIG. 3b, the two "and" gates, whose outputs are combined in an "or" gate to form the signal $d_4$, in a manner similar to that described for flip-flop D1, satisfy these conditions. For all other conditions, flip-flop D4 is set false since the input signal $_0d_4$ is high during computer times $P_{23,0-9}$ if $d_4$ is low in potential. Finally, flip-flop D5 is set true when counting from $_0P_{s9}$ to $_1P_{s0}$ and is set false when counting from $_1P_{s9}$ to $_0P_{s0}$. Thus flip-flop D5 is set true when flip-flops D1 and D4 are true and flip-flop D5 is false. As shown in FIG. 3b, the "and" gate, whose outputs are combined in an "or" gate to form the input signal $d_5$, satisfies this condition. Flip-flop D5 is set false when flip-flops D1 and D4 are true and flip-flop D5 is not set true at the same time by the true input logic. For all other conditions, flip-flop D5 remains in its existing condition since the "and" gate to form the false input signal $_0d_5$ requires the three inputs $P_{23,0-9}$, $D_1$, and $D_4$ to be at a high potential for the false signal $_0d_5$ to be high. Thus flip-flop D5 is set to a false state only during time $P_{23,0-9}$ when the above conditions are present in flip-flops D1 and D4.

Referring now to FIG. 5, a detailed circuit diagram is shown of the counter output network 110. This network in response to the output signals of flip-flops D1 to D5 (FIG. 1) decodes these signals to produce at each count a signal on one of the twenty count lines, $_0P_{s0}$ to $_1P_{s9}$. The output signals of flip-flops D3, D4, and D5 are first combined by transistors to generate signals on group count lines such as transistors 266, 267, and 268 which generate a signal denoted as $D_5'D_4'D_3'$ on group count line 226. This group count line 226 is connected to the emitters of four output transistors, such as transistors 234, 235, 236, and 237, on whose collectors the output counts $_0P_{s0}$, $_0P_{s1}$, $_0P_{s2}$, and $_0P_{s3}$, respectively, are generated. The collector of each transistor, as 234, is connected to $+20$ volt terminal 229 by way of resistor, as 230, and is clamped to ground potential by way of an appropriately poled diode, as 231. The base of each transistor in a group, such as transistor 234, is connected to a line, such as line 233, the potential level of which is controlled by flip-flops D1 and D2. Each line, as 233, which selects a count line, as $_0P_{s0}$, is connected to the collector of a p-n-p transistor, as 232. The base of transistor 232 is connected to signal $D_2$ and the emitter is connected to the collector of transistor 265. The emitter of transistor 265 is connected to ground potential and the base is connected to signal $D_1$. The signals $D_1'$ and $D_2'$ are similarly connected to transistors which control the potential level on the four lines, such as line 233, which selects count line $_0P_{s0}$ when signal $D_2'D_1'$ thereon is high in potential. Thus selection of a group count line is defined by flip-flops D3, D4, and D5 and selection of an individual count line is defined by flip-flops D1 and D2 such that a single count line is defined by all these flip-flops.

As shown in FIGS. 4 and 5, selection of count line $_0P_{s0}$ occurs when the following expression is true:

$D_5'D_4'D_3'D_2'D_1'$, i.e., flip-flops D1 to D5 are all in their "zero" state. Thus, when signals $D_1$ and $D_2$ are at a low potential, transistors 265 and 232 are caused to conduct to −50 volt terminal 238. Thus the current through resistor 262 causes a high potential signal $D_2'D_1'$ to be impressed on the base of transistor 234. Transistor 234 will conduct current from +20 volt terminal 229 through line 226 if line 226 is connected to a low potential. Since signals $D_3'$, $D_4'$, and $D_5'$ are high in potential, transistors 266, 267, and 268, respectively, are biased into conduction. Thus current passes from transistor 234, through line 226 to −8 volt terminal 269. This current from terminal 229 passes through resistor 230 causing count line $_0P_{s0}$ to be at the low potential of substantially −8 volts, which is the count signal. When a count line is not selected, the line is clamped at the high potential of ground by a diode, as 231. Thus, as each count line is selected, a low potential pulse of −8 volts appears on that line.

Referring now to FIG. 6, a circuit diagram is shown of the bank selector circuit 113 of FIG. 1. This circuit receives inputs $D_2$ and $D_5$ from counter 109 (FIG. 1) and forms the signals as determined by the logical expressions $(D_2D_5'+D_2'D_5)$ and $(D_2D_5+D_2'D_5')$ for selection of either bank No. 1 or bank No. 2 for writing, as was explained. Transistors 277 and 278 are of the p-n-p type and operate to form an exclusive "or" function in response to the signals $D_2$ and $D_5$. Line $D_2$ is connected to the base of transistor 278 and to the emitter of transistor 277, and line $D_5$ is connected to the base of transistor 277 and to the emitter of transistor 278. Thus one of the two transistors 277 or 278 will conduct only when the two input signals $D_2$ and $D_5$ are different, i.e., one is at a high potential and one is at a low potential. Under these conditions, either transistor 277 or transistor 278 conducts current from its emitter to collector and to −50 volt terminal 279 by way of resistor 280 causing a high potential to appear on line 283. When the input signals $D_2$ and $D_5$ are at the same potential, either both at the low or both at the high potential, neither transistor 277 or 278 conducts and the −8 volts of terminal 284 is impressed on line 283 through appropriately poled clamping diode 285. The logical expression $$(D_2D_5'+D_2'D_5)$$

on line 290, which indicates that the output is true or high when the inputs $D_2$ and $D_5$ are different, also expresses the condition on line 283. The signal on line 283 is applied to the bases of n-p-n transistor 286 and p-n-p transistor 287. The collector of transistor 286 is connected to ground potential and the collector of transistor 287 is connected to −8 volt terminal 288. The emitters of transistors 286 and 287 are connected to line 290. When the signal on line 283 is high, transistor 286 conducts, and ground potential, which is the logical high potential, is impressed on line 290. When the signal on line 283 is at a low potential, transistor 287 conducts and the −8 volts of terminal 288 is impressed on line 290. Thus transistors 286 and 287 act as a current driver in response to a signal of both a high and a low potential on line 283.

Since the signal $(D_2D_5'+D_2'D_5)$ on line 283 is high when the inputs to transistors 277 and 278 are different, the inverted form of this signal is represented by the expression $(D_2D_5+D_2'D_5')$. Transistor 291, which is of the p-n-p type, inverts the signal on line 283 since the base of this transistor is connected to line 283, the emitter is connected to ground potential, and the collector is connected to line 292 which in turn is connected to −50 volt terminal 293 by way of resistor 294. Thus a low signal on line 283 causes transistor 291 to conduct to terminal 293 with a resulting high potential on line 292. A high potential on line 283 prevents transistor 291 from conducting and the −8 volts of terminal 284 is impressed through appropriately poled clamping diode 295 to line 292. The driving arrangement of transistors 297 and 298 is similar to that of transistors 286 and 287, as discussed. Thus the signal on line 299 is high when the inputs to transistors 277 and 278 are both either at a high or at a low potential.

Referring to FIG. 7, a detailed circuit diagram is shown of a portion of the readout circuitry of storage unit 104 of FIG. 2. As was discussed, information is read during counter time $_0P_{s0}$ and $_0P_{s1}$ from bank No. 1, and during $_0P_{s2}$ and $_0P_{s3}$ from bank No. 2, switching back and forth between the two banks every two counts as the counter advances.

During the $P_{23,0-8}$ reading period, drive pulses from read driver 106 are applied to common line 181 which is connected by parallel lines through each column of cores of both banks to common line 180 which in turn connects to voltage source 172. The path the drive pulse takes between common line 181 and common line 180 depends on which of the read column gates, such as gate 162, is opened by the output of column select counter 109 (FIG. 1). Read driver 106, which is the source of driving current, comprises transistor 330 of which the emitter is connected to ground, the collector is connected to line 181, and the base is connected by way of inverter 315 to computer timing signal $P_{23,0-8}$. Read column gate 162 receives the counter signal $_0P_{s0}$ on the base of transistor 314, the collector of which is connected to drive line 169 which in turn is connected to line 180, and the emitter of which is connected to line 181. Line 180 is connected to inductor 331 or voltage source 172. The other end of inductor 331 is connected to −50 volt terminal 335 by way of resistor 333 and is also connected to −8 volt terminal 334 by way of appropriately poled clamping diode 332. Also connected directly to line 180 as a source of current to voltage source 172 is read auxiliary driver 173 which includes p-n-p transistor 337. The collector of transistor 337 is connected to line 180 by way of line 366, the emitter is connected to ground potential and the base is connected by way of inverter 316 to computer timing signal $P_{(23,0-8)}'$.

The readout circuitry includes sense amplifier 175 for bank No. 1 and sense amplifier 176 for bank No. 2, for example, these sense amplifiers reading from only the row of cores representing the lowest order digit. The sense amplifier 175 comprises transistor 338 of which the emitter is connected to ground potential, the collector is connected to line 182 and the base is connected to sense line 178. The junction of lines 182 and 183 connects to line $sd_1$ which is the input to flip-flop $Sd1$ of FIG. 1.

When a low signal appears on sense line 178, transistor 338 conducts to −50 volt terminal 221 by way of resistor 214 causing a high potential of 0 volts to appear on line $sd_1$. When a high signal appears on sense line 178, transistor 338 is prevented from conducting and the low −8 volt potential of terminal 220 is impressed through appropriately poled clamping diode 215 onto line $sd_1$.

The two noise cancelling cores 151 on sense line 178 between bank No. 1 and sense amplifier 175, and the two noise cancelling cores 152 on sense line 179 between bank No. 2 and sense amplifier 176 will now be explained. As was discussed, a row drive line passes through each row of cores for writing into the cores, such as row drive line 155 for the first row of cores in bank No. 1 (FIG. 2). When a row is driven by a half-current pulse during writing, all cores in the "zero" state are driven toward their "one" state, and all cores in the "one" state in that row are driven harder toward the "one" state of saturation. Thus, when this row driving pulse is released at the end of the clock period, a negative noise signal appears on the sense line from each core in one of the above conditions or the other, resulting in a current passing through the sense amplifier, as 175, to −50 volt terminal 221. This results in possible spurious triggering of flip-flop $Sd1$, for example, during the strobe pulse $C_s$ (see FIG. 11) of the next period, because of the hold storage time of transistor 338. In order to cancel this noise signal, the sense line for each row is wound in an opposite sense through the noise cancelling cores, as 151. The winding turns of the sense line around each of the two noise cancelling cores of each row are the same as the total number of turns of the sense line around the five storage cores in the rows.

Referring to the waveforms of FIG. 11 in conjunction with FIG. 7, the operation of this readout circuitry will be further explained. During this reading period, computer timing signal $P_{23,0-8}$ rises to a high potential as shown by waveform 319, and at computer time $P_{23}$ the column select counter 109 (FIG. 1) provides a negative pulse on count line $_0P_{s0}$, as shown by waveform 322. Thus read driver 106 in FIG. 7 is biased into conduction while read auxiliary driver 173 is biased out of conduction, and counter signal $_0P_{s0}$ opens read gate 162 by biasing transistor 314 into conduction. Thus current flows from ground through transistor 330 to line 181, through transistor 314, through drive line 169, and through line 180 to the —50 volt potential of voltage source 172. This current pulse, as shown by waveform 325, is of sufficient amplitude to drive a core, as 148, to its opposite state of magnetic flux, i.e., from a "one" state to a "zero" state. Thus the core changes state to cause a voltage signal on sense line 178 as shown by waveform 326. The low amplitude signal of waveform 326 during $P_{23}$ biases sense amplifier transistor 338 into conduction, current passing through transistor 338, through line $sd_1$ to trigger flip-flop $Sd1$ in response to strobe pulse $C_s$, as will be explained subsequently. Thus the outputs of sense amplifier 175 is a positive pulse, as shown by waveform 327, occurring simultaneously with strobe pulse $C_s$ shown by waveform 328.

The action of the driving arrangement will now be further explained. Read auxiliary driver 173 conducts current from ground potential at all times that read driver 106 is not conducting, i.e., during time $P_{(23,0-8)}'$. Thus current passes through indicator 331 at all times to —50 volt terminal 325. This arrangement overcomes the varying inductance load caused by different numbers of cores, as 148, changing state from a "one" to a "zero" state, to maintain, at all times, a driving pulse as shown by waveform 325 which has a fast rise time and a constant amplitude. A constant driving pulse of this type causes the core to turn over in a short period of time to produce an output signal of a large amplitude, as shown by waveform 326. Also the signal 326 resulting from a core changing state has a constant time relation and amplitude in reference to the driving pulse 325, as shown, allowing the signal to always be read at its peak amplitude.

The action of clamping diode 332 on voltage source 172 (FIG. 7) prevents a potential of lower than —8 volts from being impressed on the read gate transistors, as 329, which would cause damage in case of failure of read driver 106 or read auxiliary driver 173. During each succeeding count during computer time $P_{23,0-9}$, a read gate, as 187, 190, etc., is opened to pass a driving pulse similar to waveform 325 through the corresponding column of cores for reading into the flip-flops $Sd1$ to $Sd7$ of FIG. 1.

Referring next to FIG. 8, a circuit diagram is shown of the circuitry of FIG. 2 used for writing information into the cores. As discussed, digits are written into the cores, as 148, during computer timing period $P_{1-10}$ during which the counter 109 (FIG. 1) counts forward ten times. Each count selects a column of bank No. 1 or No. 2 for writing by passing a current pulse through the column of cores of one-half of the amplitude to drive the core to a "one" state. Column write drive gate 161 comprises transistor 347, of which the base is connected to count signal $_0P_{s2}$, the emitter is connected to line 160 and the collector is connected to drive line 168. When count signal $_0P_{s2}$ is low in potential during period $P_{1-10}$, current passes from write column driver 107 to line 160, through transistor 347, through drive line 168 and through line 358 to voltage supply 167. It is to be noted that column drive gates 163 and 184 are similar to write gate 161, gate 163 selecting a column in response to count $_0P_{s3}$ and gate 184 selecting a column in response to count $_0P_{s4}$.

Write column driver 107 comprises transistor 352 of which the emitter is connected to ground, the collector is connected to common line 160, and the base is connected to computer timing signal $P_{1-10}$ by way of an inverter 340. Voltage supply 167 comprises inductance 353 with one end connected to line 358 and the other end connected to —50 volt terminal 356 by way of timing cores 146, 147, and resistor 354. Also connected between inductance 353 and resistor 354 by way of appropriately poled clamping diode 355 is —8 volt terminal 357. Also connected directly to line 358 as a current source is write auxiliary driver 166 comprised of transistor 359. The emitter of transistor 359 is connected to ground potential, the collector is connected to lines 351 and 358 and the base is connected by way of inverter 341 to computer timing signal $P_{(1-10)}'$.

The operation of the write column driving arrangement will now be explained. During the computer basic operating cycle that signal $P_{1-10}$ is at a high potential and signal $P_{(1-10)}'$ is at a low potential, transistor 359 is caused to be biased out of conduction and transistor 352 to be biased into conduction. Thus current passes through a selected write column gate, as 161, from write column driver 107 to —50 volt terminal 356 of voltage supply 167 by way of inductance 353. During computer operating cycle times when not writing, i.e., when signal $P_{1-10}$ is at a low potential and signal $P_{(1-10)}'$ is at a high potential, write driver 107 is biased to a nonconducting state and write auxiliary driver 166 is biased to a conducting state passing current through voltage supply 167. Thus a constant current passes through inductance 353 at all times. As discussed in regard to the reading arrangement, having inductance 353 conducting at all times, ensures that a constant current pulse will pass through a selected drive line, as 168, regardless of the number of cores of that column driven to the "one" state of magnetic flux.

A binary digit is written into a core, as 148, by a coincidence of driving current through column drive line 168 and through a row drive line, as 155, i.e., a coincidence of driving currents changes the core from a "zero" to a "one" state. The timing of the row driver 117 is controlled by the signal on line 170 connected to the base of transistor 363 whose emitter is connected to —8 volt terminal 364 and whose collector is connected to the emitter of transistor 365 of gate 149. The base of transistor 365 is connected to flip-flop output signal $ws_1$ and the collector is connected to a junction 361. Bank gates 153 and 154 gate the input signal from gate 149 to either bank No. 1 or bank No. 2 in response to the signal from bank selector 113 (FIG. 1). Bank gate 153 comprises transistor 367 of which the emitter is connected to junction 361, the base is connected to signal output $(D_2D_5'+D_2'D_5)$ from bank selector 113 (FIG. 1) and the collector is connected to drive line 155 by way of current limiting resistor 375. Drive line 155 passes through a row of cores in bank No. 1 to ground. Bank gate 154 comprises transistor 377 of which the emitter is connected to junction 361, the base is connected to signal output $(D_2D_5+D_2'D_5')$ from bank selector 113 (FIG. 1) and the collector is connected to drive line 156 by way of current limiting resistor 378. Drive line 156 passes through a row of cores in bank No. 2 to ground.

The detailed circuit connections for controlling the timing of the write row driver 117 as a function of the operation of write column driver 107 will next be described. Timing gate 164 responds to the turning over of timing cores 146 and 147 by column drive signals on lines 351 and 358 to provide the timing of the row drive by passing a timing pulse through line 170 to row driver 117. Line 351 is wound through timing core 146 and line 358 is wound through timing core 147. To provide a bias which tends to hold these cores into a "zero" state, the constant current conduction through inductance 353 is likewise directed through both cores 146 and 147 in an opposite sense than lines 351 and 358. Timing gate 164 includes two sense amplifiers comprising p-n-p transistors 384 and 385. The base of transistor 385 is connected to sense line 383 which passes through timing core 147 to ground potential, the emitter is connected to ground potential and the collector is connected to junction 386. The base of transistor 384 is connected to sense line 382 which passes through timing core 146 to ground potential, the emitter is connected to ground potential and the collector is connected to junction 386. Junction 386 is connected to −50 volt terminal 387 by way of resistor 389 and is connected to −8 volt terminal 388 by way of appropriately poled clamping diode 390. The base of transistor 392, acting as an emitter follower, is connected to junction 386, the collector is connected to −8 volt terminal 393 and the emitter is connected to +20 volt terminal 394 by way of resistor 395 and to ground potential by way of appropriately poled clamping diode 396. The drivers connected to the output of transistor 392 are n-p-n transistor 398 and p-n-p transistor 399 of which their bases are connected to the emitter of transistor 392. The collector of transistor 398 is connected to ground potential and the emitter is connected to line 170. The emitter of transistor 399 is connected to line 170 and the collector is connected to −8 volts. Thus a negative-going signal on either sense line 382 or 383 causes either transistor 384 or 385 to conduct from ground to −50 volt terminal 387 causing junction 386 to be at high potential. When junction 386 is high in potential, transistor 392 is prevented from conducting and the bases of transistors 398 and 399 are clamped at ground potential. Therefore, transistor 398 conducts from ground through line 170 to −50 volt terminal 400 of write row driver 117 to impress a high potential on the base of transistor 363, causing the latter to conduct.

Referring also to the waveforms of FIG. 9, the operation of this timing arrangement will be further explained. During period $P_1$, when signal $_0P_{s2}$ is effective, a write drive pulse as shown by waveform 368 passes through timing core 147 causing an output signal to appear on sense line 383 as shown by waveform 370, resulting from the core 147 being driven to its "one" state. The low potential of this signal causes transistor 385 to conduct for an interval after the beginning of $P_1$ and before the beginning of $P_2$. Thus a high potential of 0 volt appears on line 170 within period $P_1$, as shown by waveform 372. Thus the row driving pulse through the drive lines as 155 rises well before the start of period $P_2$, as shown by waveform 373. Without this arrangement, the rise of row drive pulse may occur as shown by dashed waveform 374, because of the variation of delay of the circuits causing transients in the row and column driving arrangements. The portion of the pulse of waveform 374 extending into period $P_2$ may erroneously combine with the waveform 369 to cause a full driving current pulse to be present in a core for a short time during the timing period $P_2$ causing the core to be dirven part way up its characteristic hysteresis loop, resulting in the core settling in an abnormal position which may be the cause for the losing of information.

By the end of period $P_1$ the write drive pulse of waveform 368 rises to 0 ampere turns resulting in timing core 147 returning to its bias state characterized by being in saturation at the "zero" level of the hysteresis loop. The bias is provided by the constant current passing through voltage source 167. During period $P_2$, timing core 146 is driven toward saturation at its "one" level by the column drive pulse as shown by waveform 369. Thus the signal as shown by waveform 371 appears on sense line 382 to cause transistor 384 to conduct. Thus the timing pulse of waveform 372 appears on line 170 during $P_2$. It should now be clear that if a write drive pulse passes through the core as shown by waveform 372 during $P_1$ and $P_2$, a "one" will be written into the selected cores of the columns. Thus each succeeding period uses the signal from the opposite timing core to control the row drive timing.

Referring also to the waveforms of FIG. 11, the writing circuit of FIG. 8 will be further explained. As discussed, the first binary coded digit is written into the cores during the computer cycle time $P_1$. During $P_1$, signal $_0P_{s2}$ as shown by waveform 324 biases transistor 347 of write gate 161 to conduct from write column driver 107 which is also biased into conduction by computer timing signal $P_{1-10}$. Thus a current pulse of one-half of the ampere-turns, to drive core 148 to a "one" state, as shown by waveform 344, passes through drive line 168. Also during $P_1$, a current pulse as shown by waveform 345 passes from ground through a row of cores to junction 361 and to −8 volt terminal 364 of row driver 117 if $wS_1$ is at a high potential, indicating that a "one" is stored in flip-flop $wS1$, as shown by waveform 343. This current pulse of waveform 345 is of one-half the ampere-turns required to drive core 148 to the "one" state of magnetic flux. Thus the current pulses in the column drive line 168 as shown by waveform 344 and in the row drive line as shown by waveform 345 write a "one" into core 148. It is to be noted that the writing input circuit arrangement to the other rows of cores from flip-flops $wS2$ to $wS6$ and from input check logic network 134 of FIG. 1 is similar to the arrangement shown and described in FIG. 8 for row 1.

Referring now to FIG. 10, a detailed circuit diagram is shown of how the logical arithmetic network 132 of FIG. 1 interconnects the output flip-flops $Sd1$ and $S1$ (FIG. 1), for the first row of cores of storage unit 104, representing the lowest order bit of the binary coded digits, to the input flip-flop $wS1$. The time delaying operation of these flip-flops during recirculation will be explained in relation to the read and write timing as was previously discussed.

Flip-flop $wS1$ is arranged similarly to the counter flip-flops, described in connection with FIG. 3a, with input gates 242 and 243 and inverter gate 281, and flip-flop $Sd1$ is arranged similarly to flip-flop $wS1$ except that output drivers, as transistors 250 and 251 shown at the outputs of flip-flop $wS1$, are not required; and flip-flop $S1$ is arranged similarly to flip-flop $wS1$ except that an inverter gate, such as gate 281, is not provided with the input gates 307 and 308. Flip-flop $Sd1$ responds to the output on line $sd_1$ shown for the reading circuitry in FIG. 7. The true and false output $sd_1$ $Sd1$ and $Sd_1'$ from flip-flop $Sd1$ are connected to gates 307 and 308, respectively, of flip-flop $S1$. The true output $S_1$ of flip-flop $S1$ passes into logical arithmetic network 132. Logical arithmetic network 132 performs logical operations upon the input signals read out of the storage unit 104 of the multi-purpose register 100 and from the M shift register 139 (FIG. 1).

For illustration, logical circuitry for recirculating data and for adding data from two sources is provided as a part of logical arithmetic network 132. Thus to perform addition, the output $S_1$ of the multi-purpose register 100 and the output $M_1$ from the M register 139 is gated, in response to timing signal $P_{0-9}$ when signal A is high in potential, through "and" gates 401 and 402, respectively, to the inputs of adder stage 317. The adder stage 317 feeds its output, without delay, through "or" gate 404 to line $ws_1$ representing the trigger input to flip-flop $wS1$. It is to be noted that logical arithmetic network 132 includes an adder stage 317 together with "and" and "or" gates shown for each binary order digit of the binary coded decimal digit read from the register 100, only the circuitry for the first binary order being shown in FIG. 10.

For recirculating data through network 132, an "and"

circuit 403 is provided with computer timing signal $P_{0-9}$ as one input, operation signal A' as another input, and signal $S_1$ as a third input. The output of "and" gate 403 is then fed along with the output of adder stage 317 into "or" gate 404 whose output connects to the $wS_1$ input of the $wS1$ flip-flop. Thus, when signal A is at a high potential, the signals $S_1$ and $M_1$ are added in adder stage 317 and when signal A' is at a high potential the signals $S_1$ are recirculated. It is to be noted that the circuitry arrangement for recirculating the other binary digits from flip-flops S2 and S6 is similar to that shown in FIG. 10.

Referring again to the waveforms of FIG. 11, the action of the flip-flops S$d$1, S1, and $w$S1 will be explained in relation to the reading and writing operations as previously discussed. During computer time $P_{23}$, the signal read from the core, storing a "one," for example, as represented by waveform 326, passes through the read sense amplifier (FIG. 7) to form a signal as shown by waveform 327. Strobe signal $C_s$ as shown by waveform 328 is applied to gate 303 to trigger flip-flop S$d$1, accordingly. Thus the output S$d_1$ of flip-flop S$d$1 is at a high potential as shown by waveform 329 during the remainder of $P_{23}$. At the fall of the clock signal C at the end of $P_{23}$, gate 307 is opened to trigger flip-flop S1 true with the output $S_1$ rising to a high potential as shown by waveform 342. During computer time $P_0$, since signal $P_{0-9}$ is high in potential as shown by waveform 320, signal $S_1$ passes through logical arithmetic network 132 wherein it is subject to modification. Assuming the signal $S_1$ is not modified, gate 242 at the input of flip-flop $w$S1 is opened, causing the flip-flop to be triggered into a true state in response to the fall of the clock C at the end of $P_0$. Thus the output $wS_1$ of flip-flop $w$S1 represented by waveform 343 is clamped at the high potential of 0 volts during computer period $P_1$. At the beginning of period $P_1$ the writing signal $P_{1-10}$ represented by waveform 321 is high in potential. Thus signal $_0P_{s2}$ causes a drive pulse from write column driver 107 shown by waveform 344 to pass through a column of cores and a timing signal to be generated on line 170, as previously described. Thus, when signal $wS_1$ opens gate 149 of FIG. 8, a row drive pulse as shown by waveform 345 is passed through drive line 155 (FIG. 8). This row drive pulse of waveform 345 in coincidence with the column drive pulse of waveform 344 writes a "one" into the selected core. It should now be clear that data read from a selected column of cores during period $P_{23}$ of FIG. 11 is subject to modification in network 132 during $P_0$ and rewritten into the same column of cores during $P_1$. Thus a core read during a period, $P_{23}$, is written into two timing periods later, during $P_1$. This two period time relation occurs for each of the ten columns read during a basic computer operating cycle.

Referring now to FIG.12, a timing diagram is shown of how the register of this invention can be employed to shift the coded digits of a computer word as stored therein relative to the digit positions of the computer word period, as defined by the basic operating cycle. As explained, the computer basic operating cycle comprises 24 clock periods from $P_0$ to $P_{23}$, the basic computer word period being from $P_0$ to $P_9$ of each operating cycle. As previously noted, a coded digit is read from the storage unit 104 during periods $P_{23,0-8}$, that is, each digit is read one clock period earlier than it is actually sensed as part of a computer word by logical network 132. As explained, each column location in storage unit 104 is defined by a count of the counter 109. Thus, if the counter 109 is set to $_0P_{s0}$, for example, at the end of $P_{21}$, the column selected by signal $_0P_{s0}$ will be read during $P_{23}$, the column selected by signal $_0P_{s1}$ will be read during $P_0$, etc., and finally the column selected by signal $_0P_{s9}$ will be read during $P_8$. This mode of operation results in recirculating digits through network 132 without changing their position with respect to the fixed computer word period as defined by the timing diagram of FIG. 12. Now then, if the counter 109 is set to $_1P_{s9}$ at the end of $P_{21}$, the column selected by signal $_1P_{s9}$ will be read during $P_{23}$, the column selected by signal $_0P_{s0}$ will be read during $P_0$, etc., and finally the column selected by signal $_0P_{s2}$ will be read during $P_8$. This mode of operation results in shifting the digits in the register one digit position to the right of the timing diagram of FIG. 12, i.e., toward the most significant digit end of a computer word. Now then, if the counter 109 is set to $_0P_{s1}$ at the end of $P_{21}$, the column selected by signal $_0P_{s1}$ will be read during $P_{23}$, the column selected by signal $_0P_{s2}$ will be read during $P_0$, etc., and finally the column selected by signal $_1P_{s0}$ will be read during $P_8$. This mode of operation results in shifting the digits in the register one digit position to the left of the timing diagram of FIG. 12, i.e., toward the least significant digit end of the computer word. The digits of this readout word, after being sensed by flip-flops, as S$d$1, during a clock period, is then stepped into the flip-flops, as S1, whose outputs are sensed by arithmetic network 132 during the next clock period. Thus there is a one period delay of each binary coded digit, as previously explained, between reading a column of cores and having this information sensed at network 132. The digits of the readout thus appears at the adder input (FIG. 10) during timing periods $P_{0-9}$, i.e., in sequence with the computer basic word period, where they can be combined with digits of the word as stored in the M register, for example, which latter word is always synchronized in a fixed relation with the computer word period. As explained, each column location in storage unit 104 is defined by a read count of counter 109 for reading and by a write count for writing, the latter count always being two clock periods later. Thus, regardless of the initial setting of the counter 109, and consequently the time that the digits are read out, they are always written back into the same column of the storage unit.

While the form of the invention shown and described herein is admirably adapted to fulfill the objects primarily stated, it is to be understood that it is not intended to confine the invention to the one form or embodiment disclosed herein, for it is susceptible of embodiment in various other forms.

What is claimed is:

1. A data circulating register comprising: a first and second storage bank, each including a plurality of magnetic cores functionally dimensionally arranged solely in rows and columns; driving means for the cores; a plurality of writing flip-flops, one for each row of cores, for storing data to be written into one of the columns of said cores; a plurality of reading flip-flops, one for each row of cores, for storing data read from one of the columns of said cores; a plurality of output flip-flops responsive to the data in said reading flip-flops; column drive gates for passing signals from said driving means to said column of cores; row drive gates for passing signals from said driving means to said rows of cores; a counter having outputs connected for rendering said column drive gates operable to enable reading a column of cores in one bank in parallel into said reading flip-flops and for simultaneously rendering said column drive gates and said row drive gates operable to enable writing data from said writing flip-flops in parrallel into a column of cores of the other bank; circuit means for initially setting said counter so that the reading of the register can be started with a predetermined one of the columns of cores; and a logical network responsive to the data in said output flip-flops for triggering said writing flip-flops, whereby as said counter advances, data in each of the columns of cores can be successively circulated through said logical network.

2. A register comprising: a plurality of magnetic cores functionally disposed in a two-dimensional array divided into two storage banks of rows and columns; column driving means including drive lines connectable through said columns of cores; column gating means to pass drive pulses through selected ones of said column drive lines; row driving means including drive lines connectable through rows of cores in each of said banks; row gating means to pass drive pulses in parallel through selected ones of said row drive lines in either one bank or the other; a column select counter having outputs connected to said column and row gating means to control the passing of drive pulses through said drive lines such that each count of the column select counter causes a column of cores in one bank to be read in parallel and a column of cores in the other bank to be written into in parallel; and a basic operating counter having a repetitive timing cycle for generating signals to enable said column select counter to be preset and to count sequentially a fixed number of times during a portion of said repetitive timing cycle.

3. A register comprising: a first and second storage bank, each including a plurality of magnetic cores functionally disposed in a two-dimensional array of rows and columns; a plurality of writing flip-flop circuits, one for each row of cores, for storing data to be written into one of the columns of said cores; a plurality of reading flip-flop circuits, one for each row of cores, for storing data read from one of the columns of said cores; a plurality of output flip-flop circuits responsive to the data in said reading flip-flop circuits; read driving circuit means including gates for said column of cores; write driving circuit means including gates for said columns of cores and synchronously operated gates for said rows of cores, said row drive gates having connections to said writing flip-flop circuits; a counting circuit having outputs connected for sequentially selecting said column drive gates to enable reading a column of cores in one bank in parallel into said reading flip-flop circuits and to simultaneously enable writing data from said writing flip-flop circuits in parallel into a column of cores to the other bank; and a logical circuit responsive to the data in said output flip-flop circuits for triggering said writing flip-flop circuits, said circuits being so arranged and so operated that reading, writing, and logical manipulation of data representing different columns of cores is performed simultaneously.

4. A register comprising: a first and second storage matrix, each including a plurality of magnetic cores arranged in rows and columns; reading and writing driving means for the cores; a plurality of input flip-flop circuits for storing data to be written into one of the columns of said cores; a plurality of sensing flip-flop circuits for storing data read from one of the columns of said cores; a basic operating cycle timer; a counting circuit actuated to advance during a portion of the cycle of said basic timer and having outputs for sequentially selecting and enabling the driving of the columns of cores, each of the outputs of said counter connected to pass reading signals from the reading driving means to enable reading a column of cores in one storage matrix into said sensing flip-flop circuits and connected to pass writing signals from the writing driving means to enable writing data in said input flip-flop circuits into a column of cores of the other storage matrix; a plurality of output flip-flop circuits responsive to said sensing flip-flop circuits; and a logical circuit responsive to said ouput flip-flop circuits during a fixed period of said basic operating cycle timer for providing signals to trigger said input flip-flop circuits, said circuits arranged and operated so that as said counting circuit advances, data in each of the columns of cores of said storage matrices can be successively circulated through said logical circuit and back into the same column of cores.

5. A register comprising: a first and second storage matrix, each including a plurality of magnetic cores arranged in rows and columns; means for driving said cores; a plurality of input flip-flop circuits for storing data to be written into one of the columns of said cores; a plurality of sensing flip-flop circuits for storing data read from one of the columns of said cores; a basic operating cycle timer; a counter circuit actuated to advance during a portion of the cycle of said basic timer and having outputs for sequentially selecting and enabling the driving of the columns of cores by said driving means, each of the outputs of said counter circuit connected to enable reading a column of cores in one storage matrix into said sensing flip-flop circuits and connected to enable writing data in said input flip-flop circuits into a column of cores of the other storage matrix; a plurality of output flip-flop circuits responsive to said sensing flip-flop circuits; a logical network responsive to said output flip-flop circuits during a fixed period of said basic operating cycle timer for providing signals to trigger said input flip-flop circuits, said circuits arranged so that as said counter circuit advances, data in each of the columns of cores of said storage matrices can be successively circulated through said logical network and back into the same column of cores; and means for setting said counter circuit to a predetermined count, prior to the time it is actuated to advance during the cycle of said basic timer, so as to be able to shift the time that the columns of data are sensed by said logical network relative to the fixed period of said basic operating cycle timer.

6. An electronic data processing unit comprising: a plurality of bistable magnetic data storage cores divided into two banks, the cores in each bank arranged in columns and rows; reading and writing driving means for the cores; column reading gates associated one with each column and adapted to pass reading driving signals from the reading driving means to the columns of the two banks of cores; column writing gates associated one with each column and adapted to pass writing driving signals from the writing driving means to the columns of the two banks of cores; a plurality of writing flip-flop circuits, one for each row of cores, for storing data to be written into one of the columns of said cores; a plurality of reading flip-flops, one for each row of cores, for storing data read from a column of cores; a basic operating counting device having a repetitive timing cycle and adapted to generate signals indicative of the counting periods thereof; a counter having outputs on which counting signals indicative of the sequential count of the counter are generated, said counter being actuated to advance during a portion only of the cycle of said counting device, and having its outputs connected to the column reading and writing gates for selectively writing data stored in said writing flip-flops into a column of cores of one of said banks in response to writing driving signals applied to the writing gates from the writing driving means, and for selectively and simultaneously reading data from a column of cores in the other of said banks into said reading flip-flops in response to reading driving signals applied to the reading gates from the reading driving means; a plurality of output flip-flops responsive to data set up in the sensing flip-flops; a logical network responsive to signals indicative of the data set up in the output flip-flops during a fixed period of said basic operating cycle of the counting device for providing triggering signals for the writing flip-flops whereby data in any of the columns of cores is read therefrom, passed through the logical network and written back into the same column of cores after a predetermined period of the operating cycle, and whereby data is read from a column of one of said banks and other data simultaneously written into a column of the other of said banks and further data simultaneously passed through the logical network; and a reset circuit associated with the counter and responsive to a predetermined counting signal from said counting device, to set the counter to a predetermined count, prior to the time it is actuated to advance during the cycle of the counting device, whereby the time at which the columns of data are passed through the logical network is shiftable relative to the fixed counting periods of said counting device.

7. An electronic data processing unit comprising: a plurality of bistable magnetic data storage cores divided into two banks, the cores in each bank arranged in rows and columns; reading and writing driving means for the cores; column reading gates associated one with each column and adapted to pass reading signals from the reading driving means to the columns of the two banks of cores; column writing gates associated one with each column and adapted to pass writing signals from the writing driving means to the columns of the two banks of cores; a counter having outputs on which signals indicative of the sequential count of the counter are generated, said reading gates being individually connected to the outputs of the counter in a predetermined arrangement, and said column writing gates being individually connected to the same outputs of the counter in a different predetermined arrangement; a presetting circuit associated with said counter for initially presetting the counter to any one of the counts thereof so as to select that count from which the counter will advance sequentially; a plurality of reading flip-flops, one for each row of cores, for storing data read from one of the columns of said cores; a plurality of output flip-flops responsive to data set up in said reading flip-flops; a plurality of writing flip-flops, one for each row of cores, for storing data to be written into one of the columns of said cores; a first plurality of row writing gates associated one with each row of one of the banks of cores; a second plurality of row writing gates associated one with each row of the other bank of cores, the inputs of both said pluralities of row writing gates being individually connected to the outputs of the writing flip-flops; row writing driving means for the cores timed to operate in synchronism with the column writing driving means; bank selection means for rendering operable the first or second plurality of row writing gates; and a logical network responsive during each counting period of the counter to data read from a column of cores and set up in the output flip-flops to produce output signals from the network for triggering said writing flip-flops, whereby as the count of the counter advances data in each of the columns of cores can be read therefrom, successively circulated through said logical network, and written back onto the cores in the order determined by the output signals from the counter.

8. An electronic data processing unit according to claim 7 including: reading and writing driving lines inductively coupled to each column of cores, and a row driving line inductively coupled to each row of cores, said column writing gates for each column being responsive to said writing driving means when operable to pass a writing drive pulse on to a respective one of said writing drive lines, said column reading gates for each column being responsive to said reading driving means when operable to pass a reading drive pulse on to a respective one of said reading drive lines, and said row writing gates being responsive to said row driving means when operable to pass a writing driving pulse on to a respective one of said row drive lines as determined by the states of the writing flip-flops; and a timing core associated with said cores and adapted to change polarity in response to a drive pulse from said column writing driving means to generate a pulse for rendering said row driving means operable and to control the timing thereof as a function of the operation of the column writing driving means.

9. An electronic data processing unit according to claim 7 wherein the counter comprises a plurality of flip-flop devices having outputs combined in an output matrix in a predetermined manner to produce counting signals indicative of the sequential count of the counter, and wherein said bank selection means comprises a predetermined pair of the flip-flop devices of the counter having outputs combined in a logical circuit to produce a pair of signals, each indicative of alternate pairs of counting periods of the counter, one of said pair of signals being applied in common to the first plurality of row writing gates and the second of said pair of signals being applied in common to the second plurality of row writing gates, and wherein counting signals indicative of alternate pairs of sequential counts of the counter are individually supplied to the column writing gates associated with one bank of cores, and counting signals indicative of the remaining pairs of sequential counts of the counter are individually supplied to the column writing gates associated with the other bank of cores, said counting signals from the counter being supplied to a bank of cores for those counts of the counter at which said predetermined pair of flip-flop devices are in the state required to select the plurality of row writing gates of that bank, whereby, during two successive counting periods of the counter, data is written into those two columns of the selected bank as determined by the output signals from the counter indicative of the count thereof.

10. An electronic data processing unit comprising: a plurality of bistable magnetic data storage cores divided into at least two banks, the cores in each bank arranged in rows and columns; reading and writing driving means for the cores; column reading gates associated one with each column and adapted to pass reading signals from the reading driving means to the columns of the two banks of cores; column writing gates associated one with each column and adapted to pass writing signals from the writing driving means to the columns of the two banks of cores; a counter having outputs via which signals, indicative of the sequential count of the counter, are adapted to be transmitted, said reading gates being individually connected to the outputs of the counter in a predetermined arrangement, and said writing gates being individually connected to the same outputs of the counter in a different predetermined arrangement; a counting device having a basic operating cycle, said counter being actuated to advance the count thereof during a portion only of the basic operating cycle of the counting device; a plurality of writing flip-flops for storing data to be written into one of the columns of the cores; a plurality of reading flip-flops for storing data read from one of the columns of the cores; a plurality of output flip-flops responsive to data set up in said reading flip-flops; and a logical network including gating circuits having input signals applied thereto derived from said output flip-flops and from an additional source of data, and a manipulation circuit for combining said input signals, said gating circuits being arranged whereby data from said output flip-flops is supplied to the writing flip-flops either with or without combination with additional data from said additional source and said counter being operable during predetermined periods of the basic cycle of the counting device whereby reading of data from one column of cores, writing of data into a different column of cores and recirculation or logical manipulation of other data all occur simultaneously.

11. Digital data processor means comprising in combination: first means, including a memory array of $mn$ cells each capable of storing one information bit, said memory cells being functionally disposed in $m$ sets of $n$ cells each; second means, including means demarking basic storage operating or timing inervals, and including means effective during the first of $m$ successive ones of the demarked operational intervals to store a set of $n$ information bits and to extract a set of $n$ information bits from respective ones of a selected first pair of said sets of $n$ cells each, of said memory array, and effective during each of the next-succeeding $m-1$ demarked operational intervals to similarly store and extract respective sets of $n$ information bits into and from respectively different ones of the $m$ sets of $n$ cells each of said array of $mn$ cells, and thereafter, commencing with said first selected pair of said sets of $n$ cells, to repeat during the next following $m$ successive demarked operational periods the previous operations of storing and extracting sets of $n$ information bits in respective sets of said array of $mn$ cells, whereby sets of $n$ information bits may be recirculated in said array once for each successive period of $m$ demarked operational intervals.

12. Digital data processor means comprising in combination: first means, including a memory array of $mn$ cells each capable of storing one information bit, said memory cells being functionally disposed in $m$ sets of $n$ cells each; second means including means demarking $m+k$ basic storage operating or timing intervals where $k$ is at least two, and including means effective during each of the first $m$ successive intervals of the demarked operational intervals to extract a set of $n$ information bits from a different selected one of said $m$ sets of $n$ cells each, of said memory array, and effective during each of the last $m$ successive intervals of the demarked operational intervals to store a set of $n$ information bits into the same $m$ set of $n$ cells each, of said memory array, from which $n$ information bits were extracted $k$ intervals previously; and third means including a logical nework to permit each extracted set of $n$ information bits to be passed through said logical network during the succeeding $k-1$ intervals after extraction before being re-stored $k$ intervals after extraction in its respective set of $n$ cells each, of said array, whereby sets of $n$ information bits may be circulated in said array through said logical network for each full period of $m+k$ demarked operational intervals.

References Cited in the file of this patent

UNITED STATES PATENTS

| | | |
|---|---|---|
| 2,540,654 | Cohen | Feb. 6, 1951 |
| 2,708,267 | Weidenhammer | May 10, 1955 |
| 2,750,580 | Rabenda et al. | June 12, 1956 |
| 2,802,203 | Stuart-Williams | Aug. 6, 1957 |
| 2,832,064 | Lubkin | Apr. 22, 1958 |
| 2,858,526 | Deutsch | Oct. 28, 1958 |
| 2,884,621 | Ross | Apr. 28, 1959 |
| 2,931,014 | Buchholz | Mar. 29, 1960 |

UNITED STATES PATENT OFFICE
CERTIFICATE OF CORRECTION

Patent No. 3,054,988                  September 18, 1962

Walter G. Edwards et al.

It is hereby certified that error appears in the above numbered patent requiring correction and that the said Letters Patent should read as corrected below.

Column 2, line 40, strike out "by pulses", second occurrence; column 3, line 5, after "written" insert -- into --; line 49, for "operate" read -- operates --; column 11, line 40, for "indicator" read -- inductor --; column 14, line 52, strike out "$sd_1$"; column 15, line 10, after "other" insert -- order --; column 20, line 60, for "inervals" read -- intervals --; column 21, line 18, for "nework" read -- network --.

Signed and sealed this 29th day of January 1963.

(SEAL)
Attest:

ERNEST W. SWIDER
Attesting Officer

DAVID L. LADD
Commissioner of Patents